(12) United States Patent
Lee et al.

(10) Patent No.: US 11,087,547 B2
(45) Date of Patent: Aug. 10, 2021

(54) METHOD FOR SHARING APPLICATION MODULE AND APPARATUS USING THEREOF

(71) Applicant: LG Electronics Inc., Seoul (KR)

(72) Inventors: Chulhee Lee, Seoul (KR); Namyong Park, Seoul (KR); Taesuk Yoon, Seoul (KR); Dongkyu Lee, Seoul (KR); Eunkoo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 21 days.

(21) Appl. No.: 16/578,007

(22) Filed: Sep. 20, 2019

(65) Prior Publication Data
US 2020/0013229 A1 Jan. 9, 2020

(30) Foreign Application Priority Data
Aug. 27, 2019 (KR) .......................... 10-2019-0105090

(51) Int. Cl.
| | |
|---|---|
| *G06T 19/00* | (2011.01) |
| *H04W 16/14* | (2009.01) |
| *G06F 1/16* | (2006.01) |
| *G06F 21/30* | (2013.01) |
| *H04L 29/08* | (2006.01) |

(52) U.S. Cl.
CPC .......... *G06T 19/006* (2013.01); *G06F 1/1632* (2013.01); *G06F 21/30* (2013.01); *H04L 67/10* (2013.01); *H04W 16/14* (2013.01); *B64C 2201/044* (2013.01)

(58) Field of Classification Search
CPC ......... G06T 19/006; G06T 19/00; G06T 1/20; H04W 16/14; G06F 1/1632; G06F 21/30; G06F 9/542; G06F 21/64; G06F 2209/544; G06F 1/16; G06F 21/44; G06F 21/54; G06F 21/554; G06F 21/566; H04L 67/10; H04L 9/3263; H04L 67/08; B64C 2201/044; G06N 3/08
See application file for complete search history.

(56) References Cited

U.S. PATENT DOCUMENTS

| | | | | |
|---|---|---|---|---|
| 2020/0028848 A1* | 1/2020 | Gupta | .................. | H04L 63/0823 |
| 2020/0244297 A1* | 7/2020 | Zalewski | .............. | H04W 76/14 |

FOREIGN PATENT DOCUMENTS

KR 10-2012-0064574 6/2012

* cited by examiner

*Primary Examiner* — Xilin Guo
(74) *Attorney, Agent, or Firm* — Fish & Richardson P.C.

(57) ABSTRACT

One or more of an autonomous vehicle, a user terminal, and a server of the present disclosure may be connected to, for example, an artificial intelligence module, an unmanned aerial vehicle (UAV), a robot, an augmented reality (AR) device, a virtual reality (VR) device, or a 5G service device. An information processing method in an electronic device according to one embodiment of the present disclosure includes identifying a container that is logically docked on an operating system (OS), identifying an application corresponding to the container, identifying an event related to running of the application, and transmitting, to another node, information on a first block on difference including first identification information for the first block on difference generated based on first data associated with the event and second identification information for the container.

20 Claims, 21 Drawing Sheets

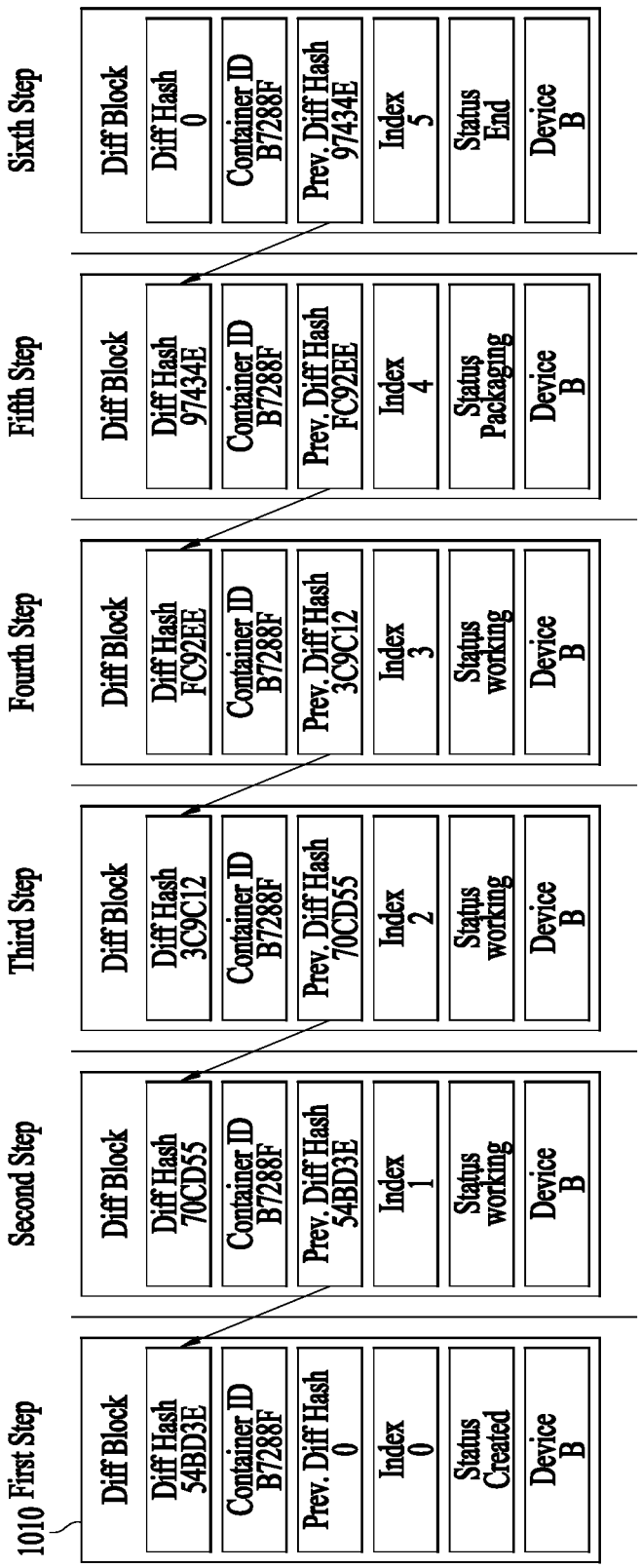

METHOD FOR SHARING APPLICATION MODULE AND APPARATUS USING THEREOF

CROSS-REFERENCE TO RELATED APPLICATION

This application claims priority under 35 U.S.C. § 119(a) to Korean Patent Application No. 10-2019-0105090, filed on Aug. 27, 2019, the disclosure of which is incorporated herein in its entirety by reference.

BACKGROUND

1. Field

Embodiments of the present disclosure relate to a method and apparatus for modularizing an application and sharing an application module among electronic devices. In addition, embodiments of the present disclosure relate to a method and apparatus for transmitting and receiving an application module among electronic devices and validating the application module.

2. Description of the Related Art

As one user uses multiple electronic devices, a need for a technology of synchronizing data between electronic devices has increased. In particular, even if the same application is installed in multiple electronic devices, a separate procedure has been needed to reflect addition or change of data caused when the user additionally uses the application. As application sharing in the cloud becomes possible, synchronization of applications and data among multiple electronic devices has recently been performed by running an application in a cloud server and allowing each electronic device to transmit and receive data through communication with the cloud server.

However, when utilizing the cloud server, for example, each electronic device may need to be connected to a network in order to communicate with the cloud server. In particular, due to a recent increase in the magnitude of user data, synchronization of data may be possible only when each electronic device is connected to a network that enables high-speed communication. Moreover, infrastructure expansion costs for the cloud server as well as an additional procedure for validating transmission/reception information may be necessary. In addition, each electronic device may require a memory space corresponding to the cloud, which may increase costs for implementing the electronic device.

To address the above description, there is a need for a method and apparatus for running, by a user, an application in multiple electronic devices, synchronizing data depending on the running of the application, and validating the data.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

Embodiments of the present disclosure are proposed to address the above description, and disclose a method and apparatus for running an application in multiple electronic devices.

In addition, embodiments of the present disclosure disclose a method and apparatus of performing communication with multiple external nodes to validity data that are changed or added when modularizing an application to exchange an application module between electronic devices and installing and running the transmitted application module.

According to one embodiment of the present disclosure, an information processing method in an electronic device includes identifying a container that is logically docked on an operating system (OS), identifying an application corresponding to the container, identifying an event related to running of the application, and transmitting, to another node, information on a first block on difference including first identification information for the first block on difference generated based on first data associated with the event and second identification information for the container.

According to another embodiment of the present disclosure, an electronic device includes a communication unit capable of communicating with another electronic device and a controller configured to control the communication unit, identify a container that is logically docked on an operating system (OS), identify an application corresponding to the container, identify an event related to running of the application, and transmit, to another node, information on a first block on difference including first identification information for the first block on difference generated based on first data associated with the event and second identification information for the container.

According to the embodiments of the present disclosure, by modularizing an application to exchange an application module between multiple devices, exchange of an application between devices is possible even when each device is not connected to a network. Further, it is possible to effectively validate data that are changed or added by the use of an application. Furthermore, it is possible to guarantee integrity of movement of an application module including user data between electronic devices.

BRIEF DESCRIPTION OF THE DRAWINGS

The above and other aspects, features, and advantages of certain embodiments will be more apparent from the following detailed description taken in conjunction with the accompanying drawings, in which:

FIG. 10 is a view for explaining a method of generating a diff block according to an embodiment of the present disclosure;

DETAILED DESCRIPTION

Figure 1:
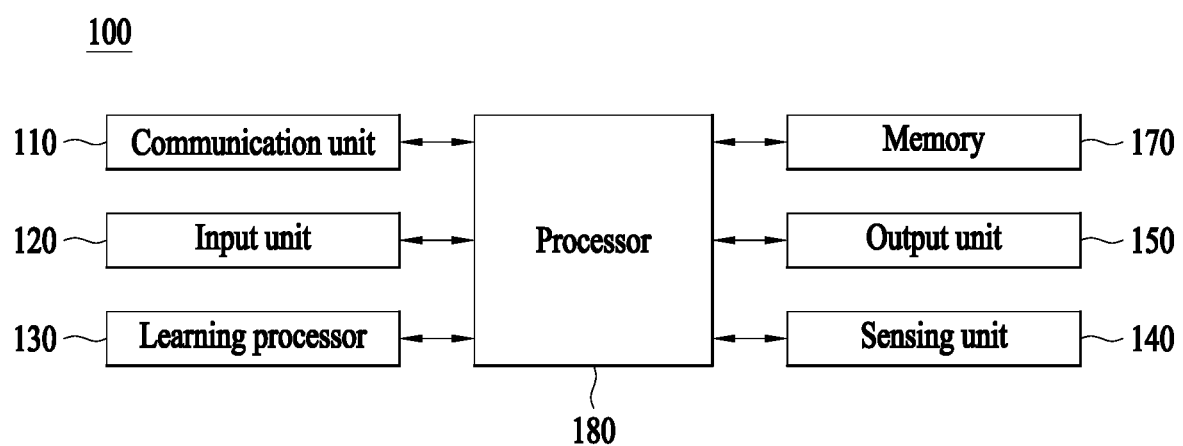
FIG. 1 illustrates an AI device according to an embodiment.

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Embodiments of the disclosure will be described hereinbelow with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device may indicate different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

Exemplary embodiments of the present invention are described in detail with reference to the accompanying drawings.

Detailed descriptions of technical specifications well-known in the art and unrelated directly to the present invention may be omitted to avoid obscuring the subject matter of the present invention. This aims to omit unnecessary description so as to make clear the subject matter of the present invention.

For the same reason, some elements are exaggerated, omitted, or simplified in the drawings and, in practice, the elements may have sizes and/or shapes different from those illustrated in the drawings. Throughout the drawings, the same or equivalent parts are indicated by the same reference numbers Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions which are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means which implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions which are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

According to various embodiments of the present disclosure, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable memory medium and be configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

In addition, a controller mentioned in the embodiments may include at least one processor that is operated to control a corresponding apparatus.

Artificial Intelligence refers to the field of studying artificial intelligence or a methodology capable of making the artificial intelligence. Machine learning refers to the field of studying methodologies that define and solve various problems handled in the field of artificial intelligence. Machine learning is also defined as an algorithm that enhances the performance of a task through a steady experience with respect to the task. An artificial intelligence device according to the embodiments of the present disclosure may perform a procedure for exchanging information generated by movement of a container including an application, and may adaptively identify an external node which is a target for information exchange.

An artificial neural network (ANN) is a model used in machine learning, and may refer to a general model that is composed of artificial neurons (nodes) forming a network by synaptic connection and has problem solving ability. The artificial neural network may be defined by a connection pattern between neurons of different layers, a learning process of updating model parameters, and an activation function of generating an output value.

The artificial neural network may include an input layer and an output layer, and may selectively include one or more hidden layers. Each layer may include one or more neurons, and the artificial neural network may include a synapse that interconnects neurons. In the artificial neural network, each neuron may output input signals that are input through the synapse, weights, and the value of an activation function concerning deflection.

Model parameters refer to parameters determined by learning, and include weights for synaptic connection and deflection of neurons, for example. Then, hyper-parameters mean parameters to be set before learning in a machine learning algorithm, and include a learning rate, the number of repetitions, the size of a mini-batch, and an initialization function, for example.

It can be said that the purpose of learning of the artificial neural network is to determine a model parameter that minimizes a loss function. The loss function maybe used as an index for determining an optimal model parameter in a learning process of the artificial neural network.

Machine learning may be classified, according to a learning method, into supervised learning, unsupervised learning, and reinforcement learning.

The supervised learning refers to a learning method for an artificial neural network in the state in which a label for learning data is given. The label may refer to a correct answer (or a result value) to be deduced by an artificial neural network when learning data is input to the artificial neural network. The unsupervised learning may refer to a learning method for an artificial neural network in the state in which no label for learning data is given. The reinforcement learning may mean a learning method in which an agent defined in a certain environment learns to select a behavior or a behavior sequence that maximizes cumulative compensation in each state.

Machine learning realized by a deep neural network (DNN) including multiple hidden layers among artificial neural networks is also called deep learning, and deep learning is a part of machine learning. Hereinafter, machine learning is used as a meaning including deep learning.

The term "autonomous driving" refers to a technology of autonomous driving, and the term "autonomous vehicle" refers to a vehicle that travels without a user's operation or with a user's minimum operation.

For example, autonomous driving may include all of a technology of maintaining the lane in which a vehicle is driving, a technology of automatically adjusting a vehicle speed such as adaptive cruise control, a technology of causing a vehicle to automatically drive along a given route, and a technology of automatically setting a route, along which a vehicle drives, when a destination is set.

A vehicle may include all of a vehicle having only an internal combustion engine, a hybrid vehicle having both an internal combustion engine and an electric motor, and an electric vehicle having only an electric motor, and may be meant to include not only an automobile but also a train and a motorcycle, for example.

At this time, an autonomous vehicle may be seen as a robot having an autonomous driving function.

FIG. 1 illustrates an AI device 100 according to an embodiment of the present disclosure.

AI device 100 may be realized into, for example, a stationary appliance or a movable appliance, such as a TV, a projector, a cellular phone, a smart phone, a desktop computer, a laptop computer, a digital broadcasting terminal, a personal digital assistant (PDA), a portable multimedia player (PMP), a navigation system, a tablet PC, a wearable device, a set-top box (STB), a DMB receiver, a radio, a washing machine, a refrigerator, a digital signage, a robot, or a vehicle. In an embodiment, the AI device may be included in an operating device associated with a container.

Referring to FIG. 1, Terminal 100 may include a communication unit 110, an input unit 120, a learning processor 130, a sensing unit 140, an output unit 150, a memory 170, and a processor 180, for example.

Communication unit 110 may transmit and receive data to and from external devices, such as other AI devices 100a to 100e and an AI server 200, using wired/wireless communication technologies. For example, communication unit 110 may transmit and receive sensor information, user input, learning models, and control signals, for example, to and from external devices.

At this time, the communication technology used by communication unit 110 may be, for example, a global system for mobile communication (GSM), code division multiple Access (CDMA), long term evolution (LTE), 5G, wireless LAN (WLAN), wireless-fidelity (Wi-Fi), Bluetooth™, radio frequency identification (RFID), infrared data association (IrDA), ZigBee, or near field communication (NFC).

Input unit 120 may acquire various types of data.

At this time, input unit 120 may include a camera for the input of an image signal, a microphone for receiving an audio signal, and a user input unit for receiving information input by a user, for example. Here, the camera or the microphone may be handled as a sensor, and a signal acquired from the camera or the microphone may be referred to as sensing data or sensor information.

Input unit 120 may acquire, for example, input data to be used when acquiring an output using learning data for model learning and a learning model. Input unit 120 may acquire unprocessed input data, and in this case, processor 180 or learning processor 130 may extract an input feature as pre-processing for the input data.

Learning processor 130 may cause a model configured with an artificial neural network to learn using the learning data. Here, the learned artificial neural network may be called a learning model. The learning model may be used to deduce a result value for newly input data other than the learning data, and the deduced value may be used as a determination base for performing any operation.

At this time, learning processor 130 may perform AI processing along with a learning processor 240 of AI server 200.

At this time, learning processor 130 may include a memory integrated or embodied in AI device 100. Alternatively, learning processor 130 may be realized using memory 170, an external memory directly coupled to AI device 100, or a memory held in an external device.

Sensing unit 140 may acquire at least one of internal information of AI device 100 and surrounding environmental information and user information of AI device 100 using various sensors.

At this time, the sensors included in sensing unit 140 may be a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar, for example.

Output unit 150 may generate, for example, a visual output, an auditory output, or a tactile output.

At this time, output unit 150 may include, for example, a display that outputs visual information, a speaker that outputs auditory information, and a haptic module that outputs tactile information.

Memory 170 may store data which assists various functions of AI device 100. For example, memory 170 may store input data acquired by input unit 120, learning data, learning models, and learning history, for example.

Processor 180 may determine at least one executable operation of AI device 100 based on information determined or generated using a data analysis algorithm or a machine learning algorithm. Then, processor 180 may control constituent elements of AI device 100 to perform the determined operation.

To this end, processor 180 may request, search, receive, or utilize data of learning processor 130 or memory 170, and may control the constituent elements of AI device 100 so as to execute a predictable operation or an operation that is deemed desirable among the at least one executable operation.

At this time, when connection of an external device is necessary to perform the determined operation, processor 180 may generate a control signal for controlling the external device and may transmit the generated control signal to the external device.

Processor 180 may acquire intention information with respect to user input and may determine a user request based on the acquired intention information.

At this time, processor 180 may acquire intention information corresponding to the user input using at least one of a speech to text (STT) engine for converting voice input into a character string and a natural language processing (NLP) engine for acquiring natural language intention information.

At this time, at least a part of the STT engine and/or the NLP engine may be configured with an artificial neural network learned according to a machine learning algorithm. Then, the STT engine and/or the NLP engine may have learned by learning processor 130, may have learned by learning processor 240 of AI server 200, or may have learned by distributed processing of processors 130 and 240.

Processor 180 may collect history information including, for example, the content of an operation of AI device 100 or feedback of the user with respect to an operation, and may store the collected information in memory 170 or learning processor 130, or may transmit the collected information to an external device such as AI server 200. The collected history information may be used to update a learning model.

Processor 180 may control at least some of the constituent elements of AI device 100 in order to drive an application program stored in memory 170. Moreover, processor 180 may combine and operate two or more of the constituent elements of AI device 100 for the driving of the application program.

Figure 2:
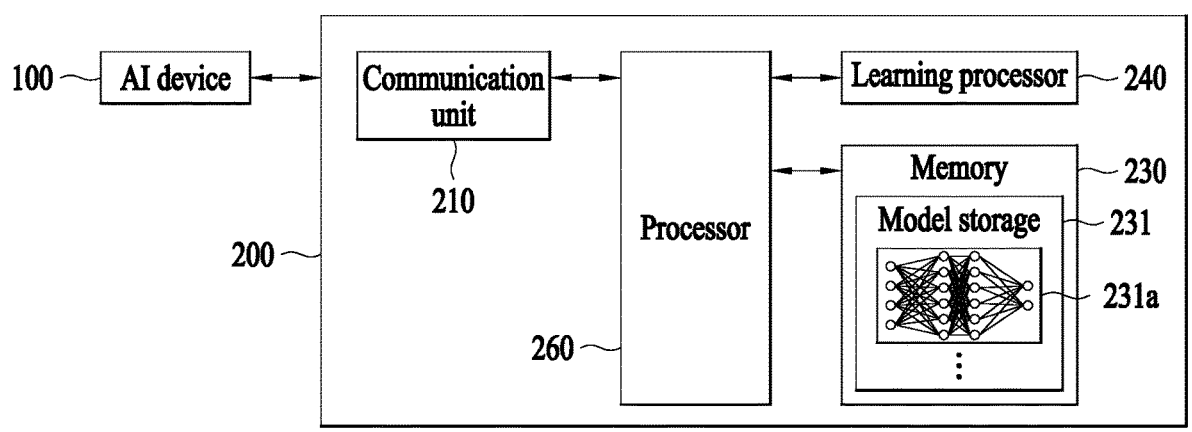
FIG. 2 illustrates an AI server according to an embodiment.

FIG. 2 illustrates AI server 200 according to an embodiment of the present disclosure.

Referring to FIG. 2, AI server 200 may refer to a device that causes an artificial neural network to learn using a machine learning algorithm or uses the learned artificial neural network. Here, AI server 200 may be constituted of multiple servers to perform distributed processing, and may be defined as a 5G network. At this time, AI server 200 may be included as a constituent element of AI device 100 so as to perform at least a part of AI processing together with AI device 100.

AI server 200 may include a communication unit 210, a memory 230, a learning processor 240, and a processor 260, for example.

Communication unit 210 may transmit and receive data to and from an external device such as AI device 100.

Memory 230 may include a model memory unit 231. Model memory unit 231 may store a model (or an artificial neural network) 231a which is learning or has learned via learning processor 240.

Learning processor 240 may cause artificial neural network 231a to learn learning data. A learning model may be used in the state of being mounted in AI server 200 of the artificial neural network, or may be used in the state of being mounted in an external device such as AI device 100.

The learning model may be realized in hardware, software, or a combination of hardware and software. In the case in which a part or the entirety of the learning model is realized in software, one or more instructions constituting the learning model may be stored in memory 230.

Processor 260 may deduce a result value for newly input data using the learning model, and may generate a response or a control instruction based on the deduced result value.

Figure 3:
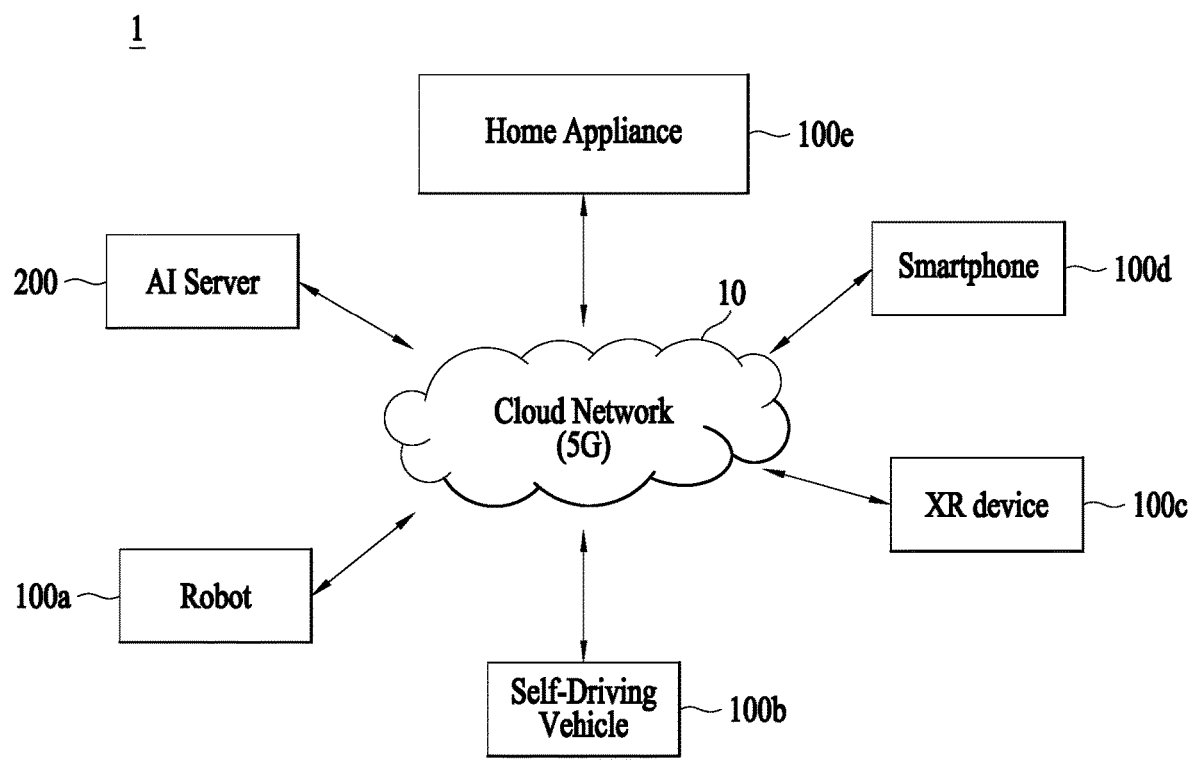
FIG. 3 illustrates an AI system according to an embodiment.

FIG. 3 illustrates an AI system 1 according to an embodiment of the present disclosure.

Referring to FIG. 3, in AI system 1, at least one of AI server 200, a robot 100a, an autonomous driving vehicle 100b, an XR device 100c, a smart phone 100d, and a home appliance 100e is connected to a cloud network 10. Here, robot 100a, autonomous driving vehicle 100b, XR device 100c, smart phone 100d, and home appliance 100e, to which AI technologies are applied, may be referred to as AI devices 100a to 100e.

Cloud network 10 may constitute a part of a cloud computing infra-structure, or may mean a network present in the cloud computing infra-structure. Here, cloud network 10 may be configured using a 3G network, a 4G or long term evolution (LTE) network, or a 5G network, for example.

That is, respective devices 100a to 100e and 200 constituting AI system 1 may be connected to each other via cloud network 10. In particular, respective devices 100a to 100e and 200 may communicate with each other via a base station, or may perform direct communication without the base station.

AI server 200 may include a server which performs AI processing and a server which performs an operation with respect to big data.

AI server 200 may be connected to at least one of robot 100a, autonomous driving vehicle 100b, XR device 100c, smart phone 100d, and home appliance 100e, which are AI devices constituting AI system 1, via cloud network 10, and may assist at least a part of AI processing of connected AI devices 100a to 100e.

At this time, instead of AI devices 100a to 100e, AI server 200 may cause an artificial neural network to learn according to a machine learning algorithm, and may directly store a learning model or may transmit the learning model to AI devices 100a to 100e.

At this time, AI server 200 may receive input data from AI devices 100a to 100e, may deduce a result value for the received input data using the learning model, and may generate a response or a control instruction based on the deduced result value to transmit the response or the control instruction to AI devices 100a to 100e.

Alternatively, AI devices 100a to 100e may directly deduce a result value with respect to input data using the learning model, and may generate a response or a control instruction based on the deduced result value.

Hereinafter, various embodiments of AI devices 100a to 100e, to which the above-described technology is applied, will be described. Here, AI devices 100a to 100e illustrated in FIG. 3 may be specific embodiments of AI device 100 illustrated in FIG. 1. In an embodiment, the apparatus for performing the method may be an arithmetic device including an AI device, and it is apparent that the method of the embodiment of the present specification may be implemented as an operating device capable of communicating with an AI device.

In an embodiment, the terminal may include an operating device, and a private terminal and a shared terminal of a user are disclosed. An application may be run in a terminal of an embodiment, and the terminal may modularize the application and transmit it to another terminal. In an embodiment, the modular application may be transmitted and received between the private terminals, and may also be transmitted and received between the private terminal and the shared terminal or between the private terminals or shared terminals.

In addition, in an embodiment, when an application is modularized and transmitted, it may be included in a container and transmitted. In an embodiment, the container may be a logical data structure including a modular application and corresponding data. For example, the container may include a file including an application and file comprising data corresponding to application, but is not limited thereto. The container may be configured in one or more data types.

Containers in the system can also include virtual file systems, virtual memory, and the like. An application may be included on the file system of the container, and information related to a blockchain including state information of the container may also be stored.

In an embodiment, at least one of addition and change of data related to an application may occur according to a user's use of an application in the terminal. Even when an embodiment refers to a change of data, this may include at least one of addition and change of data.

In addition, in the embodiment, the container may be driven on a host OS (operation system) by the controller of the terminal.

Autonomous driving vehicle 100b may be realized into a mobile robot, a vehicle, or an unmanned air vehicle, for example, through the application of AI technologies.

Autonomous driving vehicle 100b may include an autonomous driving control module for controlling an autonomous driving function, and the autonomous driving control module may mean a software module or a chip realized in hardware. The autonomous driving control module may be a constituent element included in autonomous driving vehicle 100b, but may be a separate hardware element outside autonomous driving vehicle 100b so as to be connected to autonomous driving vehicle 100b.

Autonomous driving vehicle 100b may acquire information on the state of autonomous driving vehicle 100b using sensor information acquired from various types of sensors, may detect (recognize) the surrounding environment and an object, may generate map data, may determine a movement route and a driving plan, or may determine an operation.

Here, autonomous driving vehicle 100b may use sensor information acquired from at least one sensor among a lidar, a radar, and a camera in the same manner as robot 100a in order to determine a movement route and a driving plan.

In particular, autonomous driving vehicle 100b may recognize the environment or an object with respect to an area outside the field of vision or an area located at a predetermined distance or more by receiving sensor information from external devices, or may directly receive recognized information from external devices.

Autonomous driving vehicle 100b may perform the above-described operations using a learning model configured with at least one artificial neural network. For example, autonomous driving vehicle 100b may recognize the surrounding environment and the object using the learning model, and may determine a driving line using the recognized surrounding environment information or object information. Here, the learning model may be directly learned in autonomous driving vehicle 100b, or may be learned in an external device such as AI server 200.

At this time, autonomous driving vehicle 100b may generate a result using the learning model to perform an operation, but may transmit sensor information to an external device such as AI server 200 and receive a result generated by the external device to perform an operation.

Autonomous driving vehicle 100b may determine a movement route and a driving plan using at least one of map data, object information detected from sensor information, and object information acquired from an external device, and a drive processor may be controlled to drive autonomous driving vehicle 100b according to the determined movement route and driving plan.

The map data may include object identification information for various objects arranged in a space (e.g., a road) along which autonomous driving vehicle 100b drives. For example, the map data may include object identification information for stationary objects, such as streetlights, rocks, and buildings, and movable objects such as vehicles and pedestrians. Then, the object identification information may include names, types, distances, and locations, for example.

In addition, autonomous driving vehicle 100b may perform an operation or may drive by controlling the drive processor based on user control or interaction. At this time, autonomous driving vehicle 100b may acquire interactional intention information depending on a user operation or voice expression, and may determine a response based on the acquired intention information to perform an operation.

Figure 4:
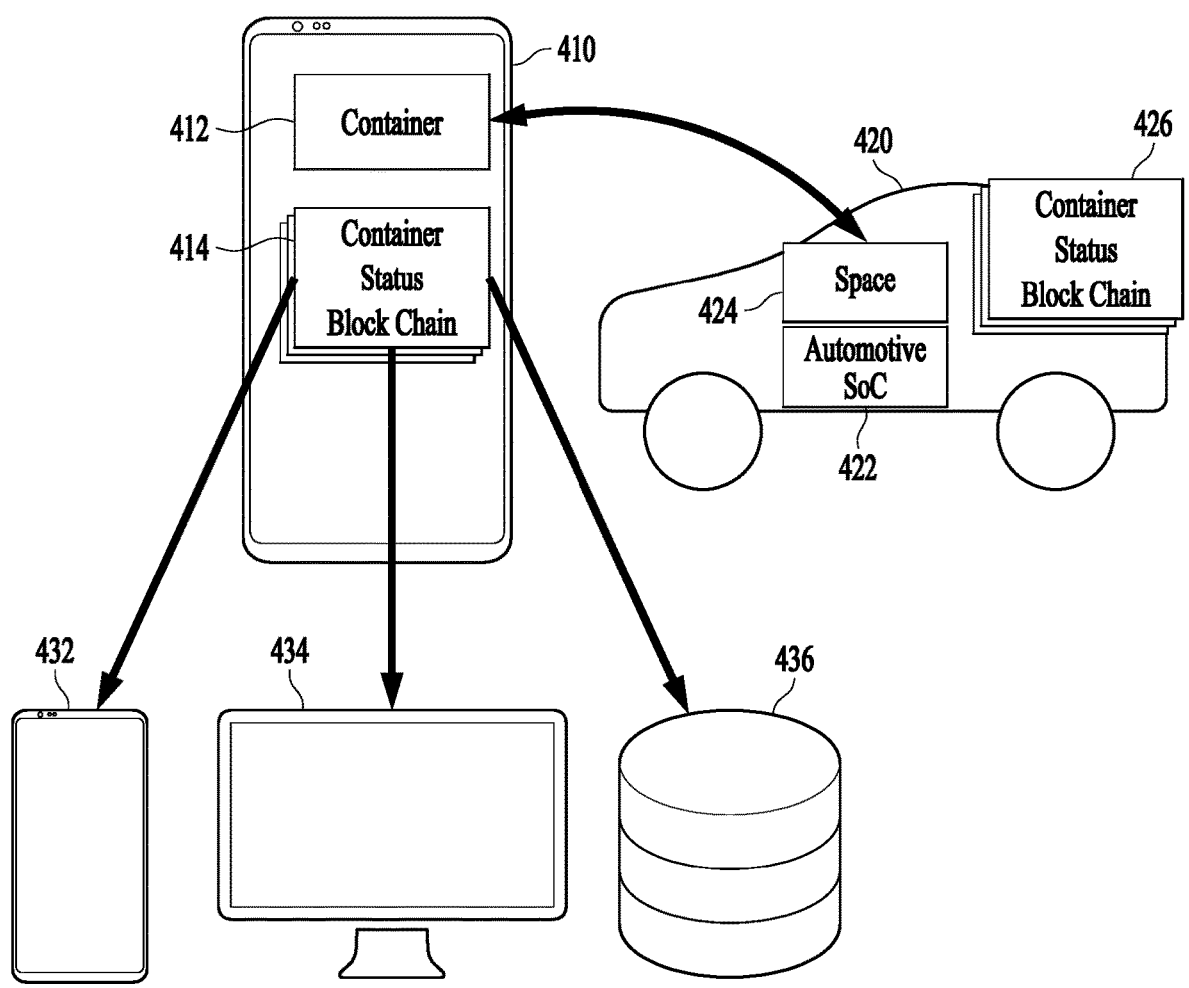
FIG. 4 illustrates a system in which an application container is moved and installed and status information thereof is shared according to an embodiment of the present disclosure.

FIG. 4 illustrates a system in which an application container is moved and installed and status information thereof is shared according to an embodiment of the present disclosure.

Referring to FIG. 4, between a user terminal 410 of a user and a common terminal 420 such as a vehicle information may be exchanged, a container 412 and a container status block chain 414 may be stored in user terminal 410 in an embodiment. Specifically, container 412 and container status block chain 414 may be stored in a memory of user terminal 410. In an embodiment, container 412 may include one or more applications.

The user who is in vehicle 420 may transmit container 412 from user terminal 410 to vehicle 420 to run one or more applications on an automotive system on chip (SoC) 422. The transmitted container may be stored in a memory space 424 in a operating device memory of vehicle 420. The operating device memory may further store a container status block chain 426 associated with the vehicle.

In an embodiment, when the status of the container is changed due to movement of container 412, container status block chain 414 may be generated in response to such a change in the status of the container, and may be transmitted to one or more other nodes 432, 434 and 436. A operating device may determine, based on container status block chain 414 transmitted to other nodes 432, 434 and 436, whether modulation/demodulation has occurred during container movement, packaging, and updating. More specifically, the operating device may store a container status block chain in several nodes, and based on the stored container status block chain, may determine whether modulation/demodulation has occurred.

In an embodiment, a container status block chain may be stored in all of user terminal 410, vehicle 420, and other nodes 432, 434 and 436, and whether modulation/demodulation has occurred in response to container movement between two nodes may be determined based on the container status block chain.

In an embodiment, user terminal 410 may transmit a container to vehicle 420, and may back up information on the transmitted container. In the following embodiments, when determining, based on a container status block chain stored in user terminal 410 and container status block chains stored in other nodes 432, 434 and 436, that modulation/demodulation has occurred, user terminal 410 may restore the backup container information into the original state thereof when in use.

Figure 5:
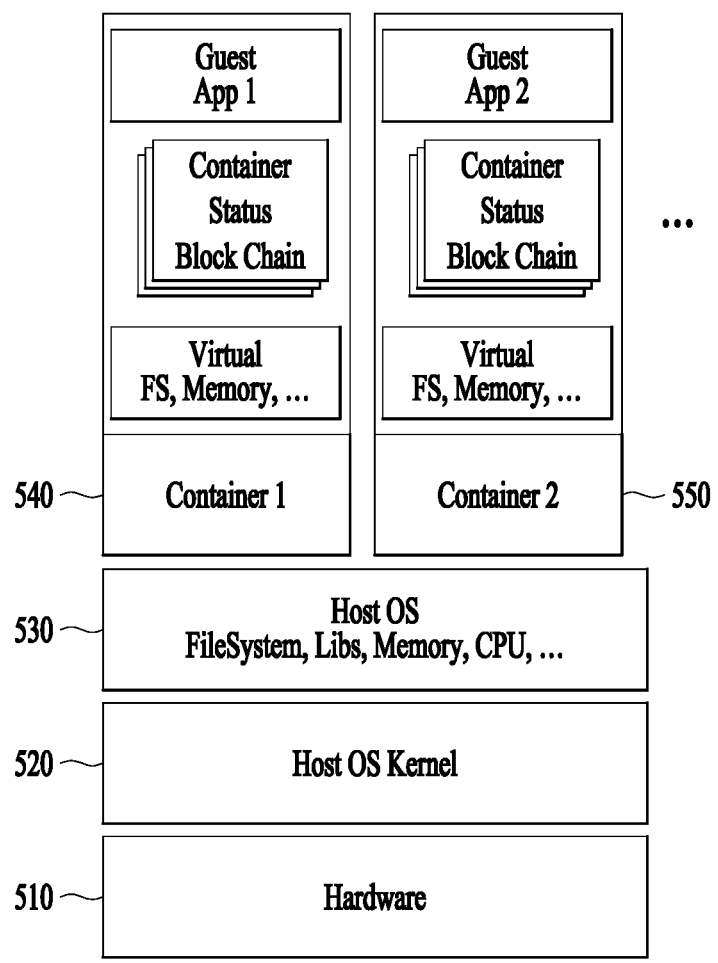
FIG. 5 illustrates a system structure of the present disclosure.

FIG. 5 illustrates a system structure of the present disclosure.

Referring to FIG. 5, a container may be configured in a system according to an embodiment.

More specifically, the system may include a host OS kernel 520 on hardware 510. A host OS 530 may be configured on host OS kernel 520. In an embodiment, host OS 530 may include at least one of a file system, a library, a memory, and a virtual CPU. Host OS 530 may run an application.

In an embodiment, one or more containers 540 and 550 may be configured on host OS 530. Each of containers 540 and 550 may include at least one of a virtual file system, a memory, and a network, and may further include an application. When the application is installed so as to be included in each container, the application may be easily used and may be conveniently moved to another operating device.

In addition, each container may also store information on a container status block chain. As such, by storing an application in a container, the application may be moved to another operating device through packaging, and the moved container may be run on a host OS of the other operating device.

In addition, container status blocks to be included in each container may be generated when the status of the container changes, and may be shared with other nodes, and whether modulation/demodulation has occurred may be verified based on the container status blocks.

Figure 6:
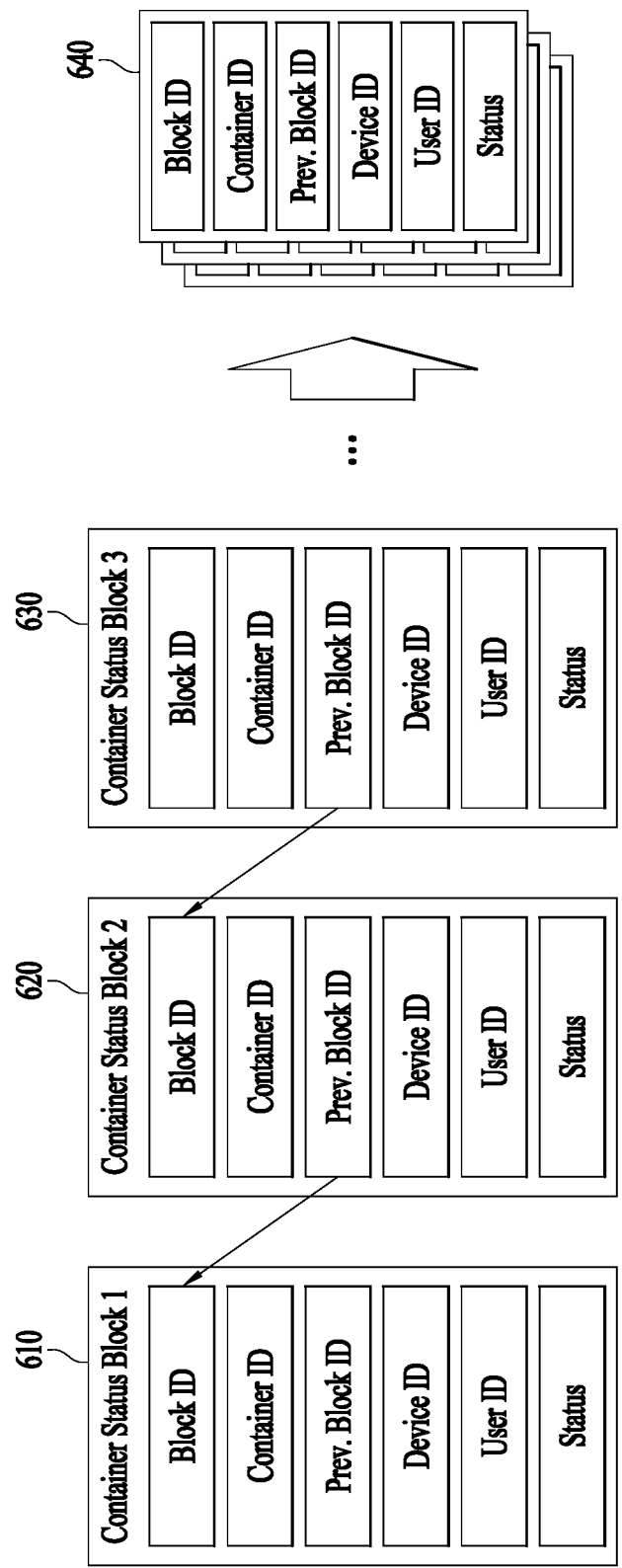
FIG. 6 illustrates a status block chain generated according to an embodiment of the present disclosure.

FIG. 6 illustrates a status block chain generated according to an embodiment of the present disclosure.

Referring to FIG. 6, a configuration of a container status block chain according to the present disclosure is illustrated.

In an embodiment, container status blocks, which form a block chain, may include information on a container status change history. For example, when a container is moved to another device and when information on an application included in a container is changed by an operation of a device in which the container is installed, information on a change in the status of the container may be recorded in the container status blocks.

Such a container status block may be generated in response to occurrence of an event with regard to the container. In an embodiment, container status blocks 1 to 3 610, 620 and 630 may be sequentially generated. Each container status block may include at least one of block identification information, container identification information, previous block identification information, device identification information, user identification information, and container status information.

The block identification information may be information for identifying a block, and may be stored as the previous block identification information when a next block is generated. For example, in an embodiment, when container status block 2 620 is generated after container status block 1 610, the previous block identification information of container status block 2 620 may be the block identification information of container status block 1 610. By forming the container status blocks as a block chain, modulation/demodulation may be detected and integrity of information may be maintained.

The container identification information may include information on a container, and may be generated based on at least one of an application included in the container, a file system, a network, and a memory. In another example, the container identification information may be an arbitrary character string that enables identification of a container.

The device identification information may be information for identifying a device associated with a container. The associated device may include a device in which the container is generated or a device in which an application corresponding to the container is executed.

The user identification information may include information for identifying a user who uses an application corresponding to a container. In an embodiment, the block identification information may be generated to include at least a part of the user identification information so that user information may be checked based on the block identification information. For example, the block identification information may include a character string for user identification.

The container status information may include information on an event by which a container status block is generated. For example, the container status information may include information on a specific event associated with a container, such as packaging for container movement, container movement and installation, and container running. As such, the type of an event by which a container status block is generated may be determined based on the container status information.

Container status blocks generated as described above may be stored as a block chain designated by reference number 640, and the block chain may be stored in multiple nodes so that whether modulation/demodulation has occurred may be verified based on the block chain.

Figure 7:
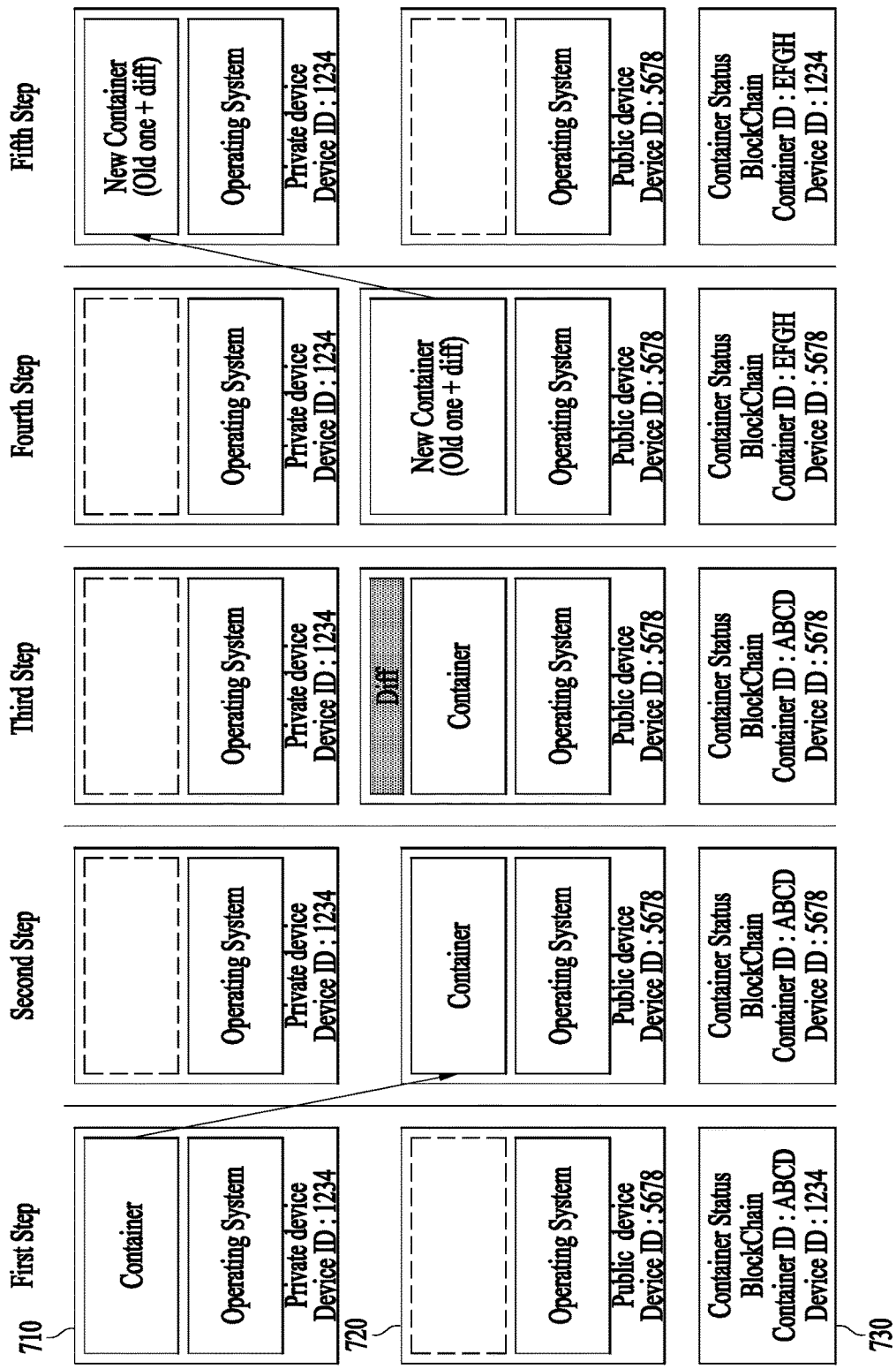
FIG. 7 illustrates a container status block chain generated in response to movement of a container between devices according to an embodiment of the present disclosure.

FIG. 7 illustrates a container status block chain generated in response to movement of a container between devices according to an embodiment of the present disclosure.

Referring to FIG. 7, there are illustrated container identification information and device identification information of container status blocks 730, which are generated by moving a container from a private device 710, device identification information of which is 1234, to a shared device 720, device identification information of which is 5678, running an application in shared device 720, and again moving the container from shared device 720 to private device 710.

In a first step, the container may be located in private device 710 and may be packaged in order to be moved to shared device 720. In the container status block generated in response to an event of packaging, container identification information may be generated based on one of information included in the container. In an embodiment, container identification information may be ABCD, and device identification information may be 1234 that is device identification information of private device 710 in which the event has occurred.

In a second step, the container may be moved from private device 710 to shared device 720 and may be installed in shared device 720. In the container status block generated in response to an event of movement and installation, container identification information may be maintained as ABCD since the container is not changed, and device identification information may be 5678 since the event has occurred in shared device 720.

In a third step, the application corresponding to the container installed in shared device 720 may be used, thus causing generation of changed data (hereinafter referred to as "diff data"). The diff may be designated by Diff, and may be generated based on at least one of application system data and user data. In the container status block generated in response to an event of generation of additional data, container identification information may also be maintained as ABCD since the container is not changed, and device identification information may be 5678 since the event has occurred in shared device 720.

In a fourth step, a new container may be generated to move from shared device 720 to private device 710. New container identification information may be generated based on at least one of existing container information and diff data. In the container status block generated in response to an event of new container generation, container identification information may be EFGH that is new container identification information, and device identification information may be 5678 since the event has occurred in shared device 720.

In a fifth step, the newly generated container may be moved to and installed in private device 710. In the container status block generated in response to an event of container movement, container identification information may be EFGH that is the new container identification information, and device identification information may be 1234 since the new container is installed in private device 710.

In this way, according to an embodiment, by setting container identification information and device identification information in container status blocks generated in response to, for example, events of movement and installation of a container, the events corresponding to the container status blocks may be determined, and whether modulation/demodulation of the container has occurred may be verified based on information on the events.

Meanwhile, it may be apparent that the container identification information and the device identification information in the container status blocks have been described in the embodiment for convenience of description, but other information may also be included in the container status blocks.

Figure 8:
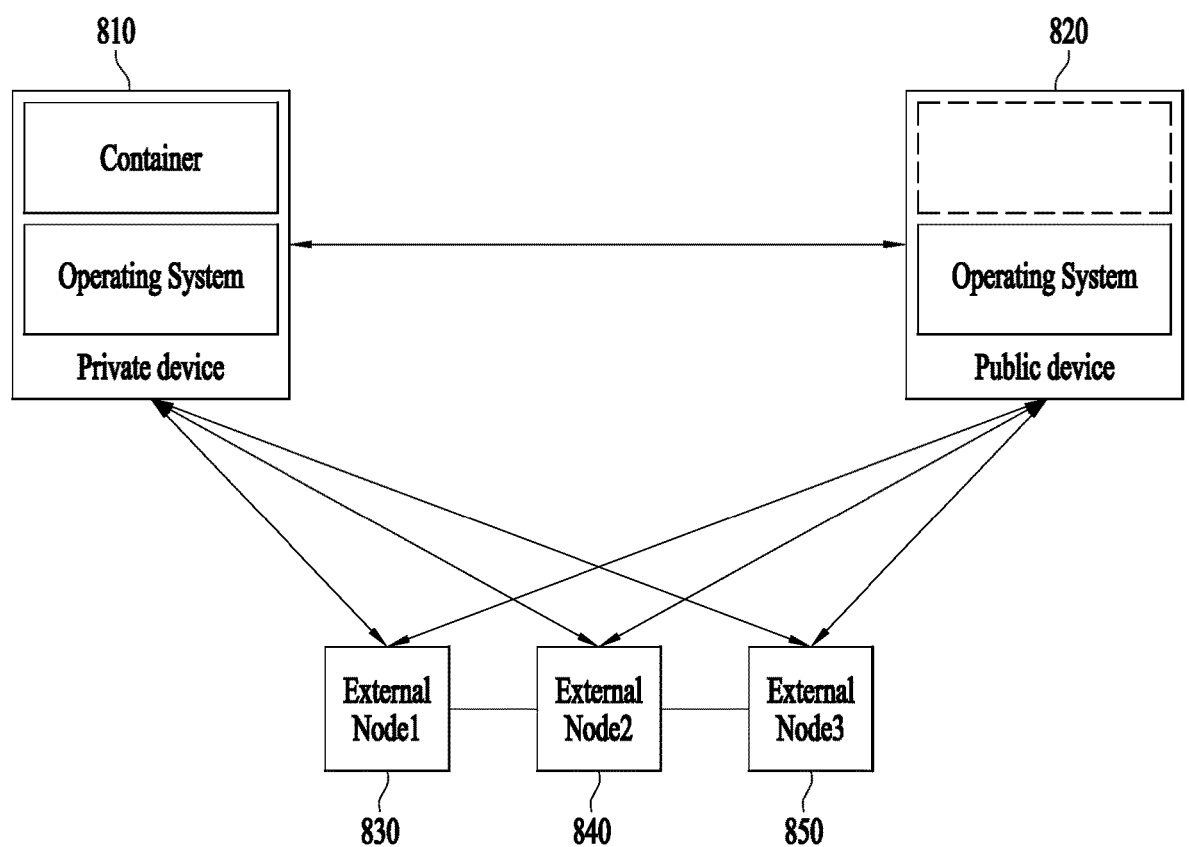
FIG. 8 illustrates movement of a container between devices and information exchange with an external node in response to the container movement according to an embodiment of the present disclosure.

FIG. 8 illustrates movement of a container between devices and information exchange with an external node in response to container movement according to an embodiment of the present disclosure.

Referring to FIG. 8, a container may be moved between a private device 810 and a shared device 820, and may be installed in one of the devices so that an application corresponding to the container may be run. At this time, a container status block may be generated in response to a change in the status of the container.

In an embodiment, a container status block may be generated in a device in which an event has occurred. For example, when the container is moved from private device 810 to shared device 820, the container status block may be generated in private device 810. The generated container status block may be stored in private device 810. In addition, the container status block may be transmitted to at least one of external nodes 830, 840 and 850 and another device associated with the container.

In an embodiment, when the number of external nodes, to which the container status block may be transmitted, is equal to or less than a specific number, each device may search for additional nodes. For example, when a container is installed in a device associated with a vehicle, the device may search for a vehicle that may share a container status block with the device through broadcast. In an embodiment, broadcast information for searching for an external node may include at least one of information included in the container status block. In addition, an external node which has received the broadcast information may determine, based on the received information, whether or not to operate as a node that shares the container status block with the device.

In this way, multiple external nodes may store container status block chains, respectively, and whether modulation/demodulation has occurred may be easily verified via comparison of information in the container status block chains of the multiple external nodes.

Figure 9:
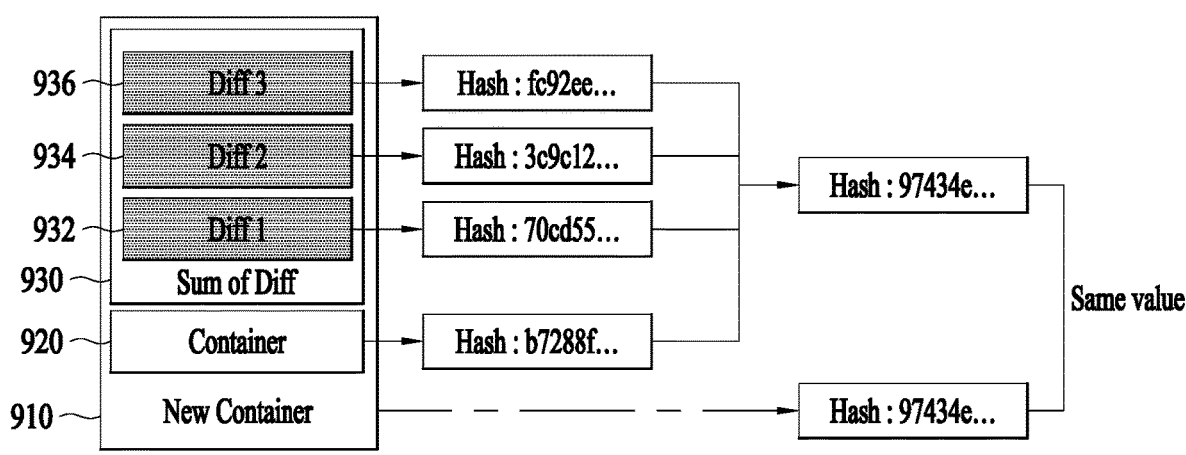
FIG. 9 is a view for explaining a method for verifying modulation and demodulation according to a change in a container according to an embodiment of the present disclosure.

FIG. 9 is a view for explaining a method for verifying modulation/demodulation according to a change in the status of a container according to an embodiment of the present disclosure.

Referring to FIG. 9, there is illustrated a method of installing a container in a specific device, generating a hash value for additional data generated when a user uses an application included in the container, and identifying a new container.

In an embodiment, a container 920 may be installed in a specific device, and additional data may be generated when an application included in container 920 is run. The additional data may include a value different from an existing data value. In an embodiment, a total of three additional data 932, 934 and 936 are illustrated. These diff data values may be separately stored. Moreover, a sum of diff data values, designated by reference numeral 930, may be stored, but may be divided when a specific event occurs.

In an embodiment, a hash value may be a result value derived by inputting data to a specific hash function, and the hash function may be a typical hash function or a hash function obtained by modifying a portion of the typical hash function. Through the use of such a hash function, even when the magnitude of input data is large, a hash value as a character string for the input data may be easily derived.

In an embodiment, identification information of existing container 920 may include a value derived based on data values included in the container. For example, identification information of container 920 may include a value derived by inputting all data included in the container to a hash function. In addition, the identification information of container 920 may include a hash value derived based on a hash value for a first subset and a hash value for a second subset of a part of data in the container. For example, a hash value for data excluding user data and a hash value for additional data generated by the user may be connected in series, and a hash value for the connected values may be included in the identification information of container 920. In an embodiment, a result value for a hash function may correspond to a value of data included in container 920. The hash function is given by way of example for convenience of description, without a limitation thereto.

In an embodiment, hash values for respective additional data 932, 934 and 936 may be derived. At this time, a hash value derived by connecting a hash value for the existing container and the hash values for respective additional data 932, 934 and 936 in series may be 97434e . . . . The derived hash value may be a hash value for a new container 910. By generating new container identification information, a relationship between the existing container and the new container may be examined. As such, even if data is added due to the use of an application by the user, the additional data may be easily checked since new container identification information is generated based on hash values for respective parts of information included in a container.

For example, when a specific device receives a new container, a hash value may be derived based on new container identification information, existing container identification information, and additional data identification information, and may be compared with the new container identification information so that data change due to the new container and a user operation may be checked.

FIG. 10 is a view for explaining a method of generating a diff block according to an embodiment of the present disclosure.

Referring to FIG. 10, diff blocks generated in respective steps are illustrated. Hash values derived based on data generated in the respective steps may be used as diff block identification information. The diff blocks may be stored as a diff block chain.

According to an embodiment, a diff block 1010 may include at least one of information on a hash value for diff data, identification information of a container in which the diff data is generated, information on a hash value for a previous block, diff block index information, status information associated with generation of the diff data, and information on a device in which the diff data is generated.

In a first step, a container, identification information of which is B7288F, may be installed and executed in a specific device, whereby a diff block may be generated. A hash value for diff data may be 54BD3E, and a previous block hash value may be set to zero since there is no previous block. Status information may be set to diff block generation associated with initial container generation.

In a second step, diff data may be generated as the user uses data. A hash value for the diff data may be 70CD55, and a previous block hash value may be 54BD3E. Index information may be a value increased by 1 from that of a previous block, and status information may be set to working of an application corresponding to the container.

In a third step, a hash value for diff data as in the second step may be 3C9C12, and a previous block hash value may be 70CD55. Index information may be a value increased by 1 from that of a previous block, and status information may be set to working of the application corresponding to the container.

In a fourth step, a hash value for diff data as in the third step may be FC92EE, and a previous block hash value may be 3C9C12. Index information may be a value increased by 1 from that of a previous block, and status information may be set to working of the application corresponding to the container.

In a fifth step, packaging may be performed to move the container to another device. Thus, status information may be set to packaging. In addition, a hash value for data generated in response to packaging may be 97434E, and a previous block hash value may be FC92EE. Index information may be a value increased by 1 from that of a previous block.

In a sixth step, packaging ends and thus, status information may be set to end of packaging. Since no additional data is generated when packaging ends, a hash value may be zero.

The remaining information may be generated based on values of a previous diff block.

As such, a container may be installed in a specific operating device, and a diff block may be generated based on diff data generated by at least one of a change in the status of the container and running of an application corresponding to the container. Since the diff block may be shared among and stored in multiple devices, even when the container is installed and executed in another device, information on a data change history may be checked and whether modulation/demodulation has occurred may be verified.

For example, when a specific node receives a diff block based on status information on packaging, the specific node may return, to a transmission node, a result of verifying the diff block based on previous diff block information. For example, information to be returned may include a verification result for a received block, and the verification result may include new container identification information generated based on previous diff block information. More specifically, the specific node may sequentially receive existing container identification information and hash values for diff data, and may derive new container identification information based on the received information. By returning the derived new container identification information, whether modulation/demodulation of a newly generated container has occurred may be verified. When verification based on the returned information ends, a corresponding diff block chain may be deleted. However, such deletion may be made selectively, and information on the corresponding diff block chain may be transmitted to other nodes.

In an embodiment, when a specific node does not receive a diff block from a transmission node, the specific node may request retransmission to the transmission node or may request transmission of a diff block to another node based on an index value.

In an embodiment, when a specific node does not receive a diff block including status information on "end" for a predetermined time after initially receiving a diff block from another node, the specific node may determine that a corresponding block chain is expired and may delete the block chain.

In an embodiment, when only a part of information on a diff block may be transmitted to another node. For example, only hash values may be sequentially shared with the other node. In this case, in order to prevent an omission of the hash values received by the other node, whether the other node has successfully received the hash values may be checked, and the hash values may be retransmitted when the other node has failed to receive the hash values.

FIGS. 11A to 11E are views for explaining generation of a status block and a diff block chain in response to container movement according to an embodiment of the present disclosure.

Referring to FIGS. 11A to 11E, there is illustrated generation of a status block and a diff block chain in response to container movement from a private device 1110 to a shared device 1120 and the use of an application in shared device 1120 by the user.

Figure 11A:
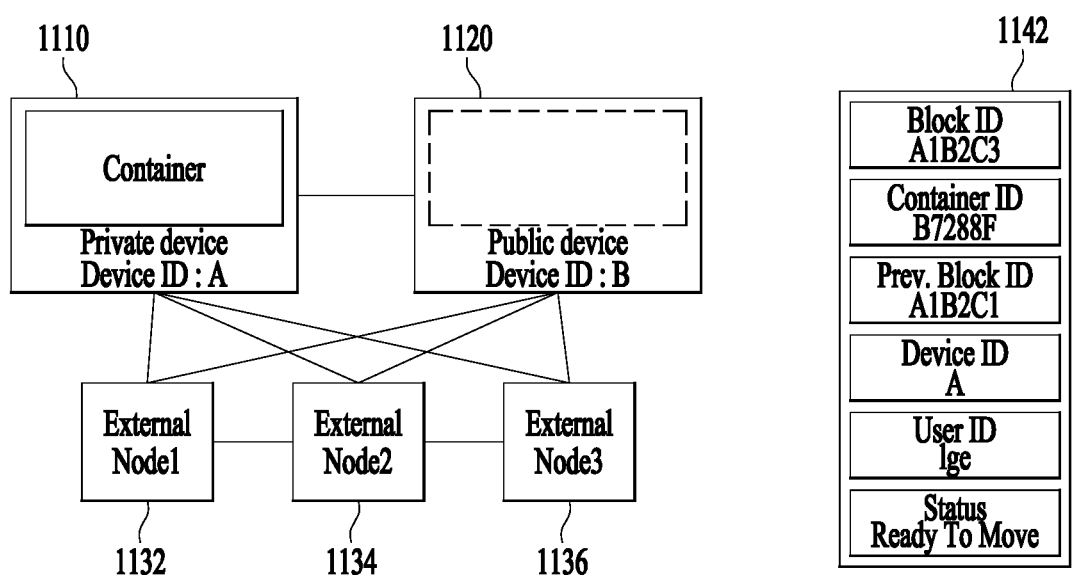
FIGS. 11A to 11E are views for explaining generation of a status block and a diff block chain in response to container movement according to an embodiment of the present disclosure.

In FIG. 11A, a container may be ready to move from private device 1110, a device identifier of which is A, to shared device 1120, a device identifier of which is B. At this time, block chain information may be shared with external nodes 1 to 3 1132, 1134 and 1136.

In an embodiment, when container movement from private device 1110 to another device ends, a status block 1142 may be generated. Status block 1142 may include block identification information, and the block identification information may be generated based on at least one of information included in the block, block generation time information, and information included in the container. In an embodiment, block identification information may be set so as to serially increase based on the order of generation.

In an embodiment, container identification information may be generated based on at least a part of data included in the container.

Previous block identification information may include identification information of a previous block generated before the status block is generated.

Device identification information may include information on a device associated with the container at the time of generation of the status block.

User identification information may include identification information of the user associated with the use of the container.

Status information may include information on an event by which the status block is generated. In an embodiment, the status information may be set to information indicating that the container is ready to move.

Figure 11B:
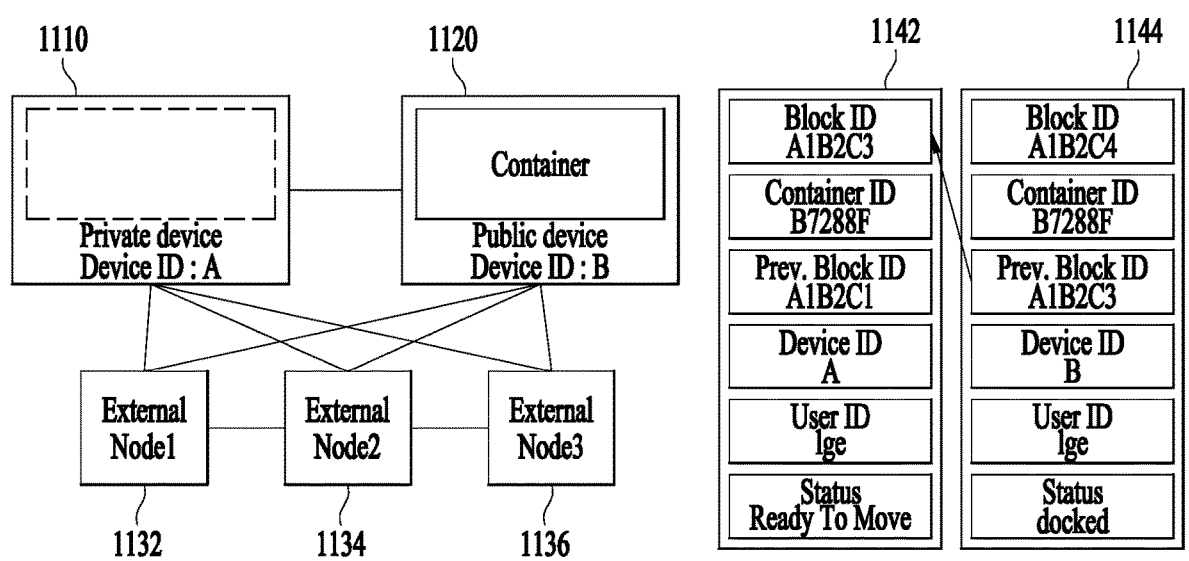

In FIG. 11B, the container may be moved from private device 1110 to shared device 1120 and thus, a status block 1144 may be generated.

In an embodiment, block identification information of status block 1144 may be generated based on previous block identification information. Since the same container is used, container identification information may be equally maintained. Previous block identification information may include the block identification information of status block 1142. Device identification information may be set to B since the container is moved to shared device 1120. Since the same user uses the container, user identification information may be set as before. Status information may be set to information indicating that the container docks with shared device 1120.

In an embodiment, information on the status block may be shared with external nodes 1 to 3 1132, 1134 and 1136.

Figure 11C:
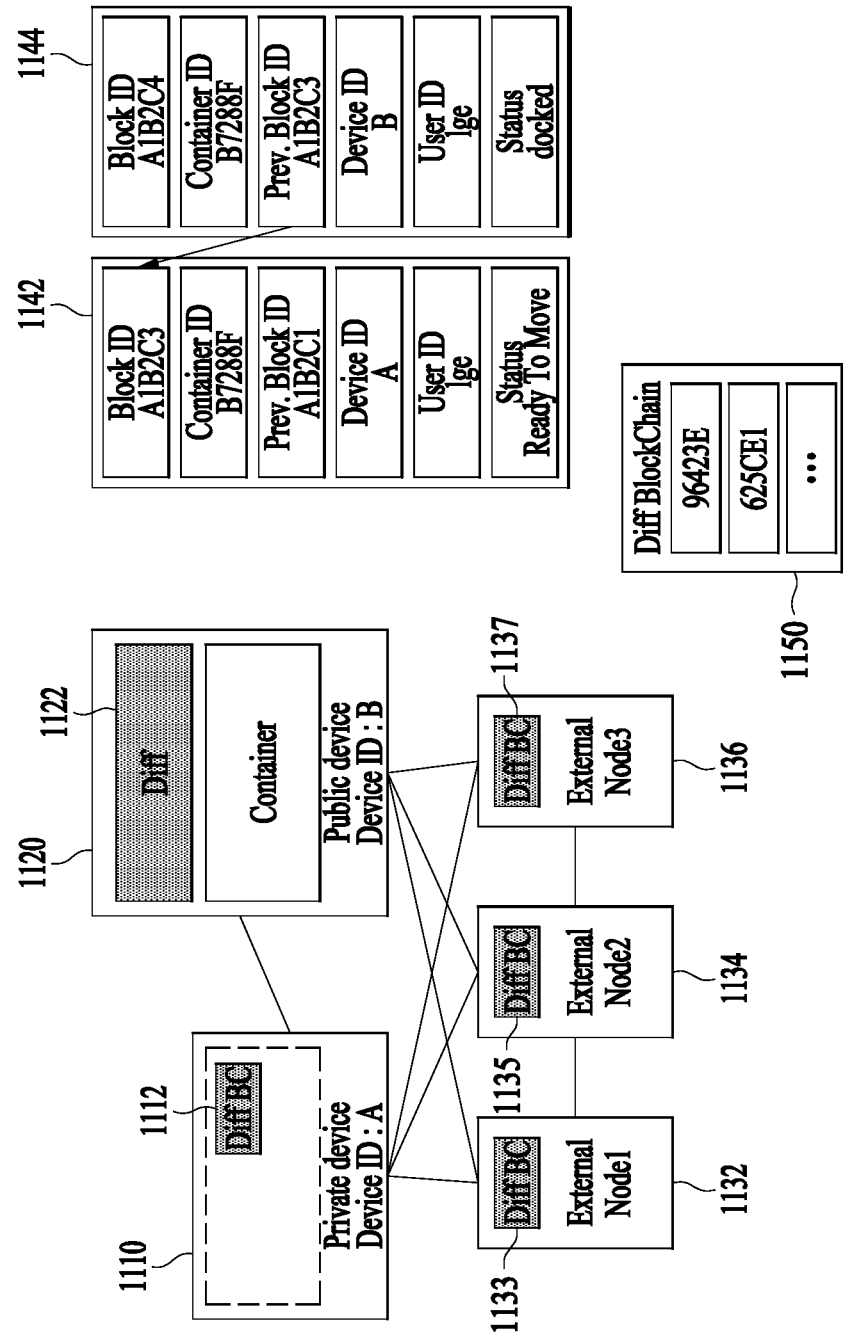

In FIG. 11C, the container may dock with shared device 1120, and diff data 1122 may be generated due to the use of data by the user. When the diff data is generated, a diff block chain including the diff data may be generated and may be shared with another node. In an embodiment, the diff block chain may be shared with at least one of private device 1110 and external nodes 1 to 3 1132, 1134, and 1136. Specifically, diff block chains 1112, 1133, 1135 and 1137 may be shared, respectively, in private device 1110 and external nodes 1 to 3 1132, 1134, and 1136. A specific diff block chain may be stored as designated by reference numeral 1150. In an embodiment, generation of a diff block chain may be performed as in the embodiment described with reference to FIG. 10.

Shared device 1120 may create a diff block chain in response to an event of diff data generation due to the use of an application corresponding to the container, and may share the diff block chain with any other device or node.

Accordingly, to share data generated newly by a user operation with other nodes, a hash value for diff data generated by the user operation may be broadcast to other nodes. In this way, nodes constituting a network may hold a block chain for a container.

Figure 11D:
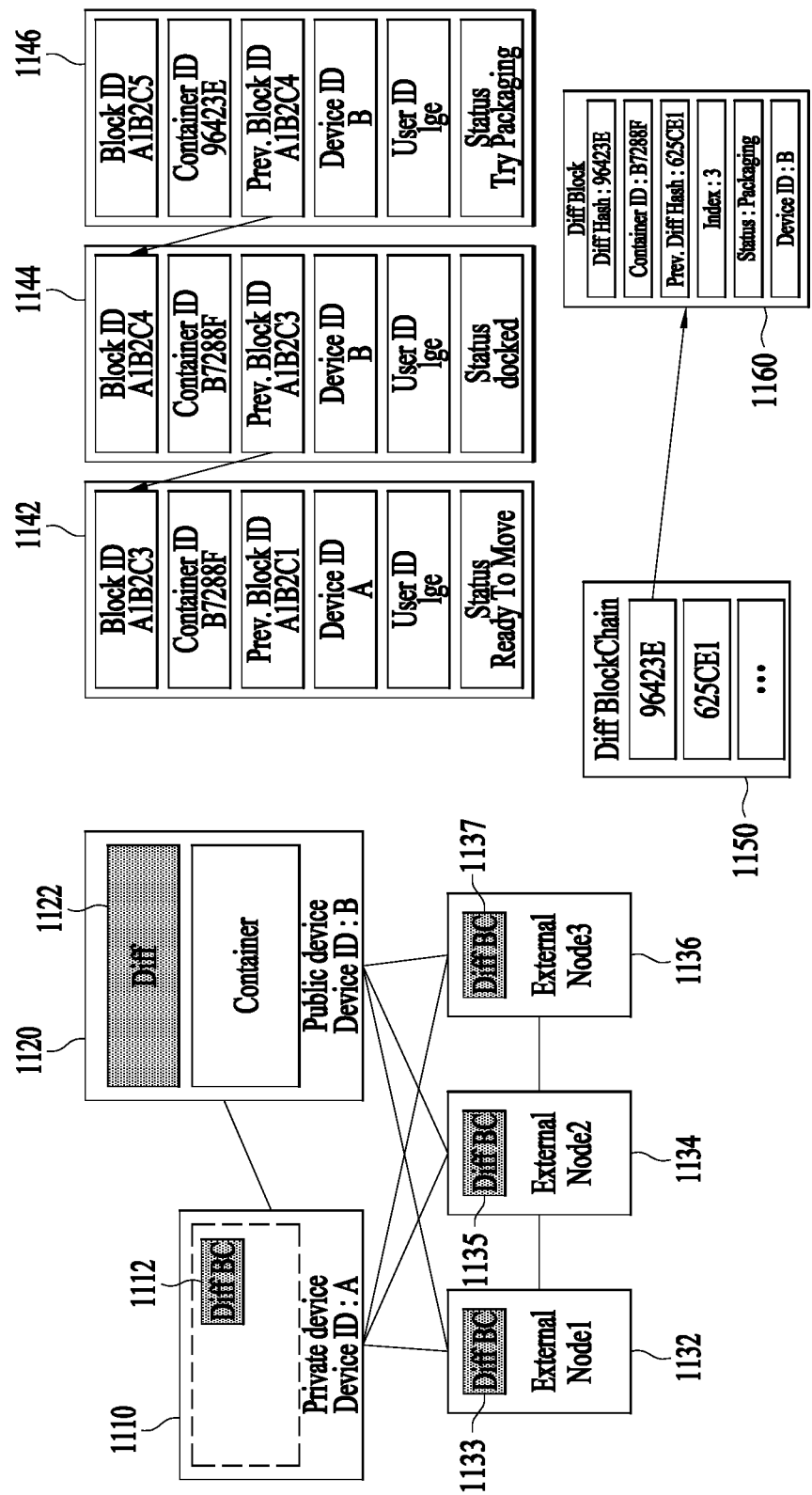

In FIG. 11D, the user may end an application in shared device 1120 and may perform packaging to ready to move the container to another device. At this time, a status block 1146 may be generated. Block identification information of status block 1146 may be generated based on previous block identification information. Since the container including the newly generated diff data in shared device 1120 is a packaging target, container identification information may be generated based on at least one of existing container information and diff data. For example, new container identification information may be 96423E, which may be generated based on at least one of previous container identification information which is B7288F and values recorded in a diff block chain. A diff block 1160 may be generated in response to packaging, and may include identification information of the container to be packaged. In addition, identification information of a container to be newly packaged may be determined based on a hash value for a newly generated diff block.

In an embodiment, it may be apparent that a hash value of diff block 1160, which is 96423E, is described as being set to new container identification information, but the new container identification information is not limited thereto, and a hash value of a character string in which B7288F as existing container identification information and hash values for diff data are combined in series may be set to new container identification information. This may correspond to the embodiment described with reference to FIG. 9.

In an embodiment, when a new container is generated and new container identification information is generated, information on a status block associated with generation of the new container may be broadcast to another node. The other node that has received the broadcast information may return or broadcast verification information about the received information. In this way, nodes may verify identification information of a newly generated container based on existing container identification information and diff block information, may determine whether there is any change other than an action performed by the user, and may return or broadcast a determined result. A probability of modulation/demodulation may be verified via information sharing.

Figure 11E:
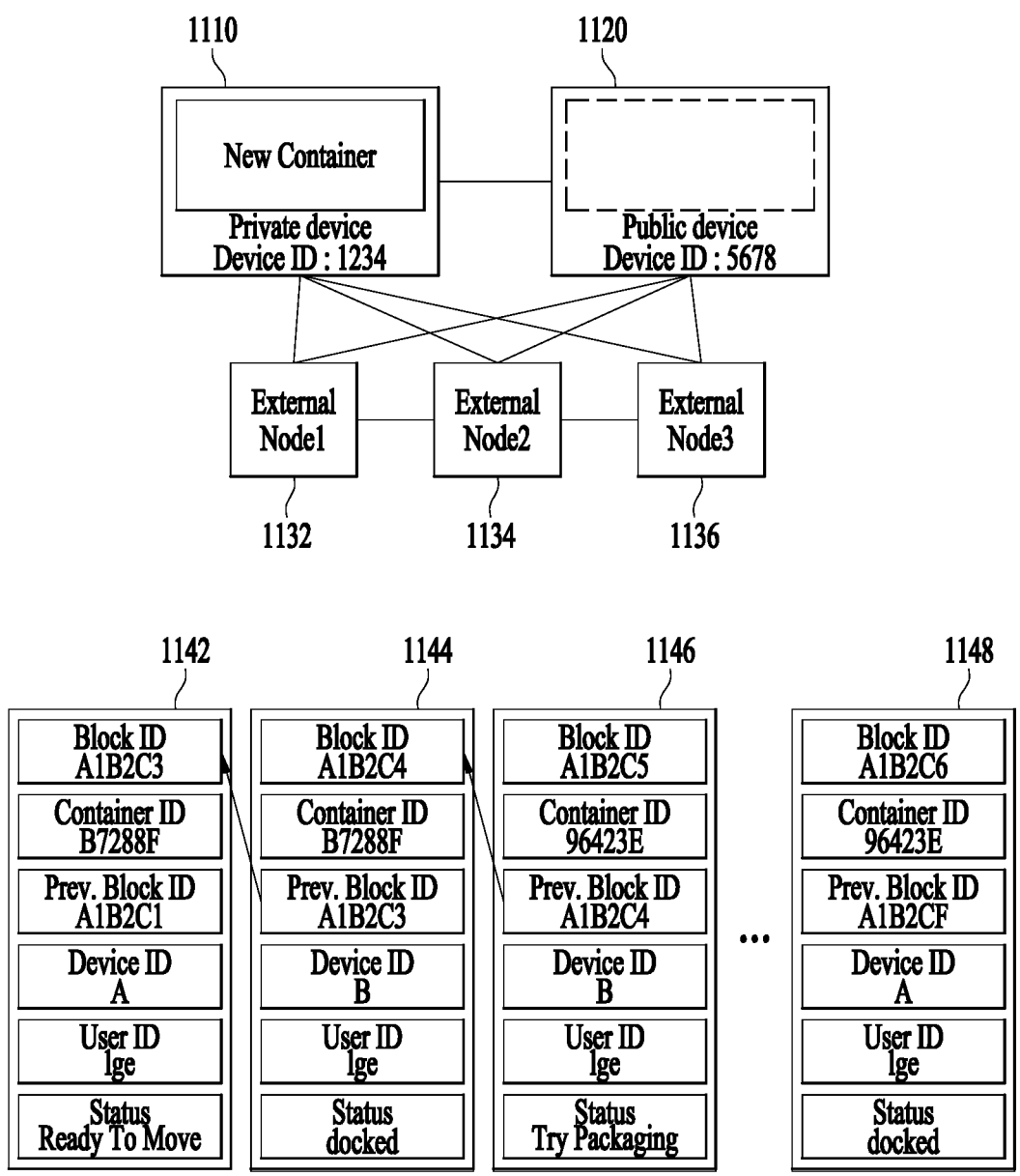

In FIG. 11E, the container may again dock with private device 1110, and thus, a status block 1148 may be generated. Block identification information of status block 1148 may be generated based on previous block identification information. Container identification information may include an identifier of the new container packaged in shared device 1120. Device identification information may be set to the device identification information of private device 1110, and user identification information may be set as before. Status information may be set to information indicating that the container docks with private device 1110.

When container movement has occurred as described above, whether modulation/demodulation of a container has occurred may be verified based on at least one of status block information and diff block chain information shared among other nodes. When diff data is generated by execution of an application in shared device 1120, information on a diff block generated in response to diff data may be shared among other nodes, and new container identification information may be generated based on existing container information and diff block information. Thus, whether modulation/demodulation of a container has occurred may be detected by comparison between received container identification information and shared information. In an embodiment, verification about whether modulation/demodulation has occurred may be performed by at least one of devices between which a container is moved.

Meanwhile, in an embodiment, a container status block may be used to record history information such as container movement between devices or a change in the status of a container, and a diff block may be used to record at least one of change and addition of data in a container.

Figure 12:
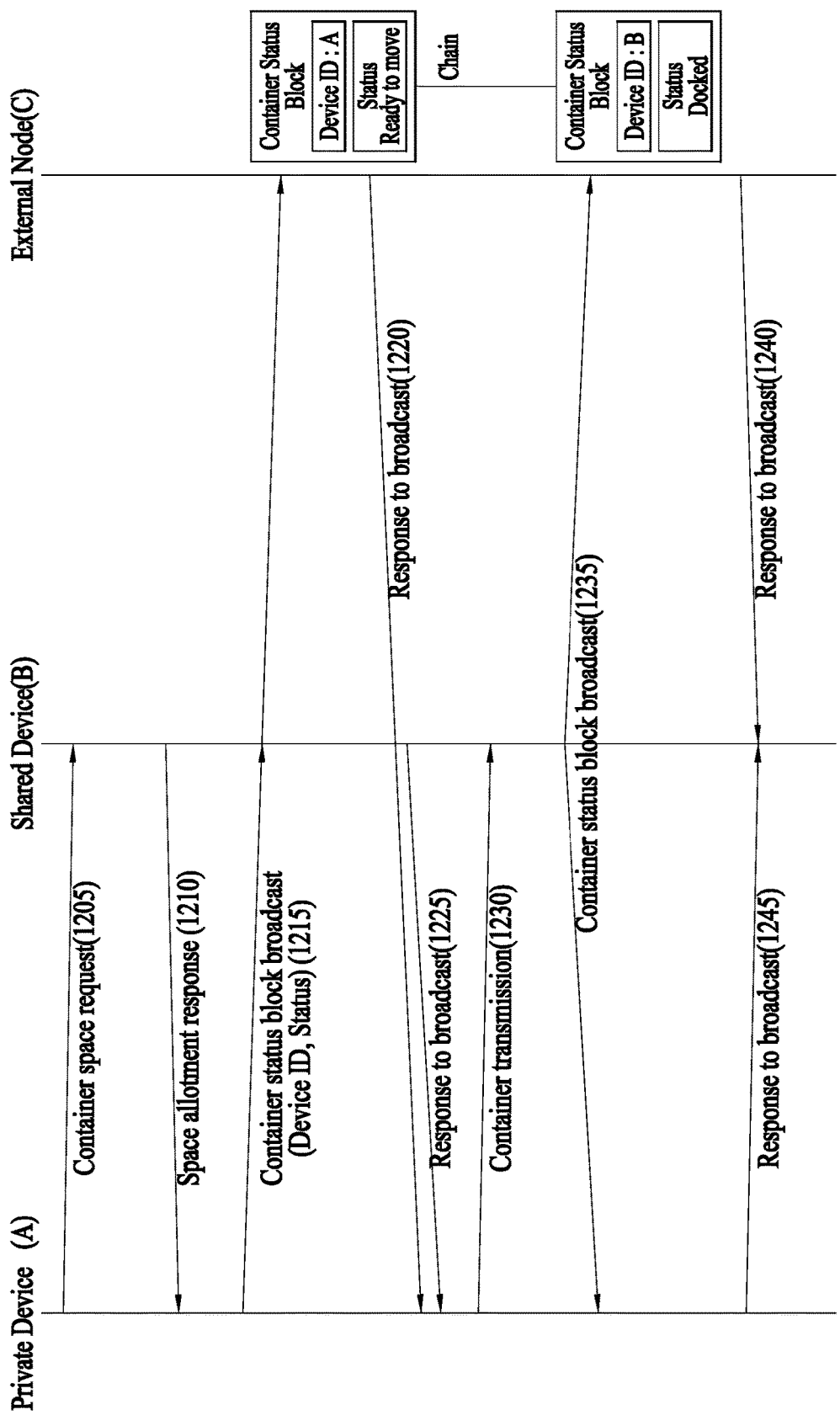
FIG. 12 is a view for explaining information exchange between devices in response to container movement and a status block based on information exchange according to an embodiment of the present disclosure.

FIG. 12 is a view for explaining information exchange between devices in response to container movement and a status block based on information exchange according to an embodiment of the present disclosure.

Referring to FIG. 12, there is illustrated a method of moving a container from a private device to a shared device and sharing information on container movement with an external node.

In step 1205, the private device may transmit a container space request message to the shared device in order to move a container from the private device to the shared device. In an embodiment, the container space request message may include at least one of container information and requested space information. In an embodiment, the container information may include information on an application corresponding to the container. In addition, the container space request message may include one of container status information. In an embodiment, the shared device may perform authentication for determining whether or not to allot a space in response to the container space request message.

In step 1210, the shared device may allot a space in which the container may dock with the shared device in response to the container space request message, and may transmit a space allotment response message to the private device.

In step 1215, the private device may ready to move the container in response to the space allotment response message, and may broadcast container status block information. In an embodiment, the container status block information may include at least one of device identification information and status information. In some embodiments, the status block information may include at least one of the information described in the embodiment of FIG. 6. In the present embodiment, the device identification information may be set to A which is identification information of the private device, and the status information may be set to information indicating that the container is ready to move. In addition, in an embodiment, at least a part of broadcast information may be stored in a device that broadcasts the information.

In step 1220, the external node may transmit, to the private device, a response message indicating that the broadcast information has been received, and in step 1225, the shared device may also transmit, to the private device, a response message indicating that the broadcast information has been received. On the other hand, in the embodiment, when at least one of the shared device and the external node does not receive the status block information, information retransmission may be requested to the private device.

In step 1230, the private device may transmit the container to the shared device. For example, the private device may transmit the container when receiving a broadcast response from more than a specific number of nodes. The specific number may be a predetermined number, or may be set based on the number of nodes required for verifying whether modulation/demodulation has occurred. In an embodiment, the specific number may change based on a communication environment associated with the private device. The specific number may change based on the number of nodes capable of receiving broadcast information.

In step 1235, the shared device may receive and dock with the container, and may broadcast container docking information to other nodes. For example, among the broadcast information, device identification information may be set to B that is shared device identification information, and status information may be set to information indicating that the container has docked with the shared device.

In steps 1240 and 1245, the private device and the external node may receive the broadcast information, and may transmit a reception response message to the shared device.

In an embodiment, the broadcast information may be stored in a block chain form in each node, and may then be used in a certain procedure such as verification.

Figure 13:
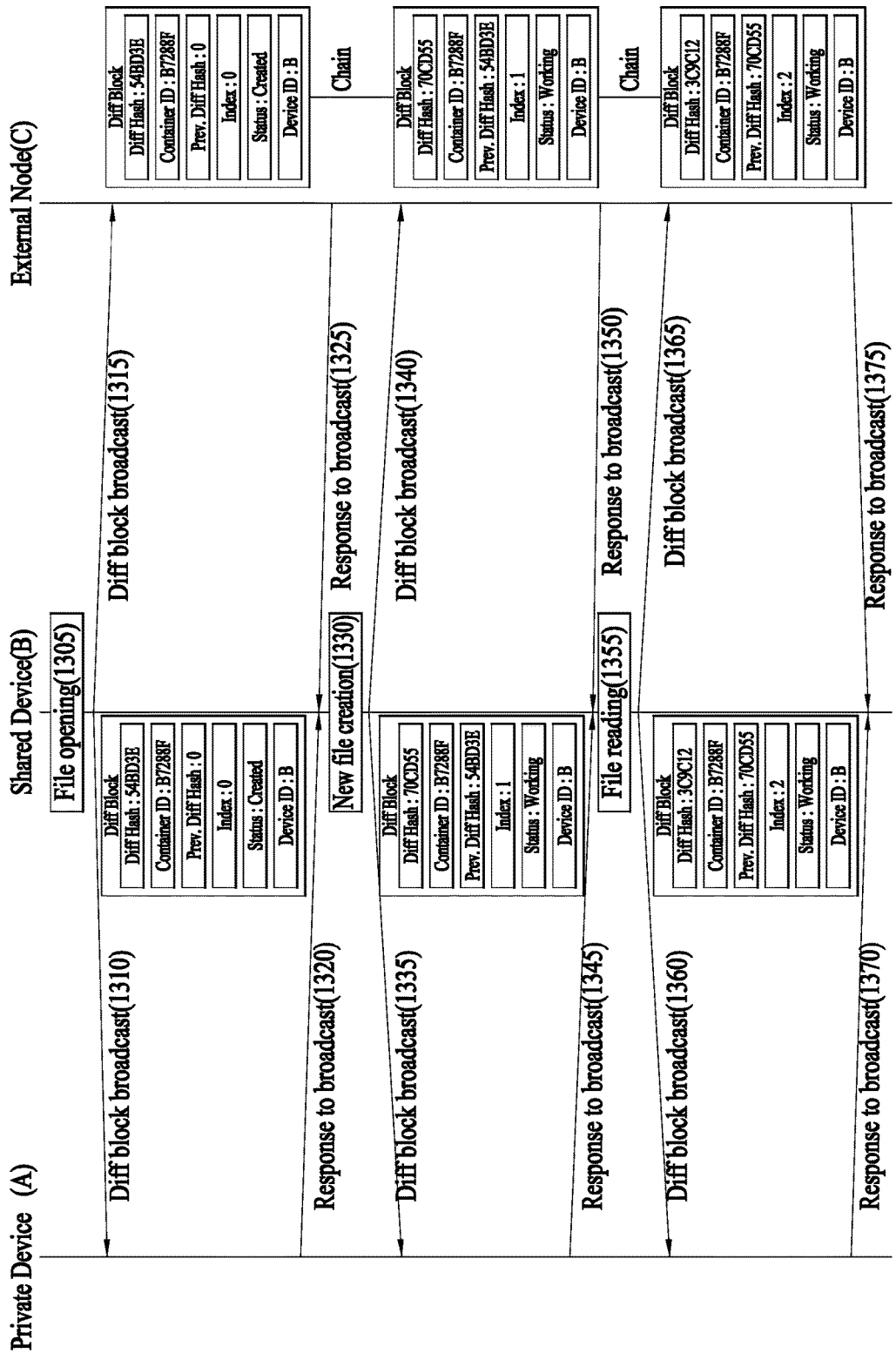
FIG. 13 is a view for explaining a method of generating a diff block in response to a change in the status of a moved container and exchanging diff block generation information according to an embodiment of the present disclosure.

FIG. 13 is a view for explaining a method of generating a diff block in response to a change in the status of a moved container and exchanging diff block generation information according to an embodiment of the present disclosure.

Referring to FIG. 13, there is illustrated a method of docking a container with a shared device and generating a diff block in response to execution of an application corresponding to the container to share the diff block with other nodes.

In step 1305, a file opening event may occur in the application corresponding to the container docked with the shared device. In steps 1310 and 1315, the shared device may broadcast diff block information related to the file opening even to other nodes. In an embodiment, status information may be set to information indicating the occurred event. In an embodiment, the shared device may store at least a part of the broadcast information. In an embodiment, the diff block may include at least a part of the diff block information described in the embodiment of FIG. 10.

In steps 1320 and 1325, the shared device may receive broadcast response information from a private device and an external node.

In step 1330, a file generation event may occur in the application corresponding to the container docked with the shared device. In steps 1335 and 1340, the shared device may broadcast diff block information related to the file generation event to other nodes. In an embodiment, status information may be set to information indicating the occurred event.

In steps 1345 and 1350, the shared device may receive broadcast response information from the private device and the external node.

In step 1355, a file read event may occur in the application corresponding to the container docked with the shared device. In steps 1360 and 1365, the shared device may broadcast diff block information related to the file read event to other nodes. In an embodiment, status information may be set to information indicating the occurred event.

In steps 1370 and 1375, the shared device may receive broadcast response information from the private device and the external node.

In this way, diff block information generated by execution of the application corresponding to the container docked with the shared device may be shared with other nodes, whereby whether modulation/demodulation of the container has occurred may be verified.

Figure 14:
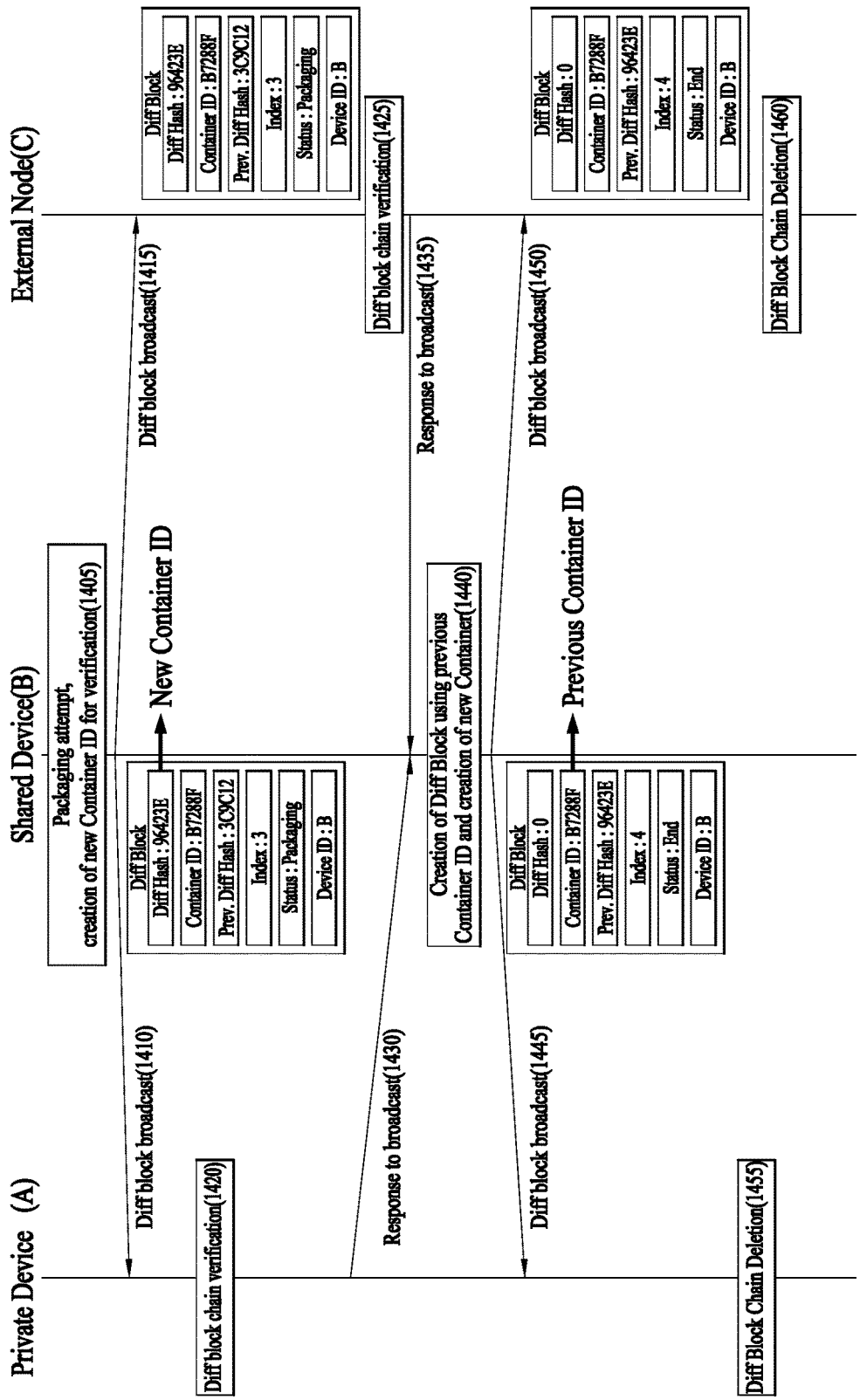
FIG. 14 is a view for describing a method for generating a container including information changed due to the use of an application according to an embodiment of the present disclosure.

FIG. 14 is a view for describing a method for generating a container including information changed due to the use of an application according to an embodiment of the present disclosure.

Referring to FIG. 14, a process of generating a new container in order to move the container from a shared device to another device is illustrated.

In step 1405, the shared device may attempt to package a new container including diff data generated by working of an application corresponding to the container docked with the shared device. In an embodiment, the shared device may generate new container identification information. In an embodiment, the new container identification information may be generated based on at least one of information included in the container. For example, the new container identification information may be determined based on diff data, and may also be determined based on existing container identification information as well as diff data. In an embodiment, when attempting to package the new container, diff hash information may be set to a hash value for a character string in which basic container identification information and previous diff hash information are connected in series. This is because the new container identification information may be determined based on diff hash information generated at the time of packaging. A diff block generated in response to packaging may include a diff hash value, and may also include at least one of existing container identification information, a previous diff hash value, index information, status information, and device information.

In steps 1410 and 1415, information on the generated diff block may be broadcast to other nodes.

In steps 1420 and 1425, a private device and an external node may verify a diff block chain based on received diff block information. In an embodiment, each node may perform verification based on received diff block status information. For example, when receiving a diff block including status information related to packaging, each node may perform verification based on previous diff block information. For example, each node may generate new container identification information based on existing container identification information and a previous diff block hash value, and may compare the new container identification information with the received diff hash information.

In steps 1430 and 1435, the private device and the external node may transmit a broadcast response with respect to a verification result to the shared device.

In step 1440, the shared device may create a new container based on the broadcast response information, and may create a diff block in response to generation of the new container. In an embodiment, when receiving normal response information indicating that there is no modulation/demodulation, the shared device may create a new container including diff data, and may generate a diff block in response to generation of the new container. For example, in the diff block, a diff hash value may be set to zero, previous container identification information may be maintained as container identification information, and a previous diff hash value may be set. Index information may be set to a value increased by 1 from that of previous index information. Status information may be set to information indicating that packaging has ended, and device identification information may be set to identification information of the shared device.

In steps 1445 and 1450, the diff block information may be broadcast to the private device and the external node.

In steps 1455 and 1460, the private device and the external node may delete a diff block chain, which has previously been stored, based on at least one of the diff hash value and the status information of the received diff block.

In this way, by performing verification based on a diff block chain of another node at the time of packaging, whether modulation/demodulation has occurred may be verified and the integrity of the process may be guaranteed.

Figure 15:
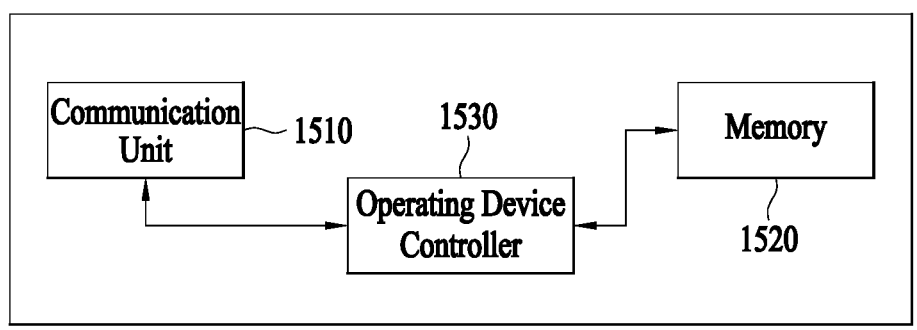
FIG. 15 is a view for explaining a operating device according to an embodiment of the present disclosure.

FIG. 15 is a view for explaining an operating device according to an embodiment of the present disclosure.

Referring to FIG. 15, the operating device may include a communication unit 1510, a memory 1520, and a controller 1530. In an embodiment, at least one of the private device, the shared device, and the external node described above may include the operating device. In an embodiment, the communication unit includes a transceiver for transmitting and receiving a signal.

Communication unit 1510 may transmit and receive information to and from another node. Communication unit 1510 may perform at least one of wired communication and wireless communication, and may transmit and receive information to and from other devices, servers, and networks.

Memory 1520 may store information associated with the operating device. In addition, memory 1520 may store at least a part of data transmitted and received through communication unit 1510. In an embodiment, memory 1520 may include a nonvolatile memory. Meanwhile, in an embodiment, an external server connected through communication unit 1510 may be used as memory 1520.

Controller 1530 may control an operation of the operating device according to an embodiment. Controller 1530 may include at least one processor. Controller 1530 may control operations of communication unit 1510 and memory 1520, and may control general operations of the devices described above.

Figure 16:
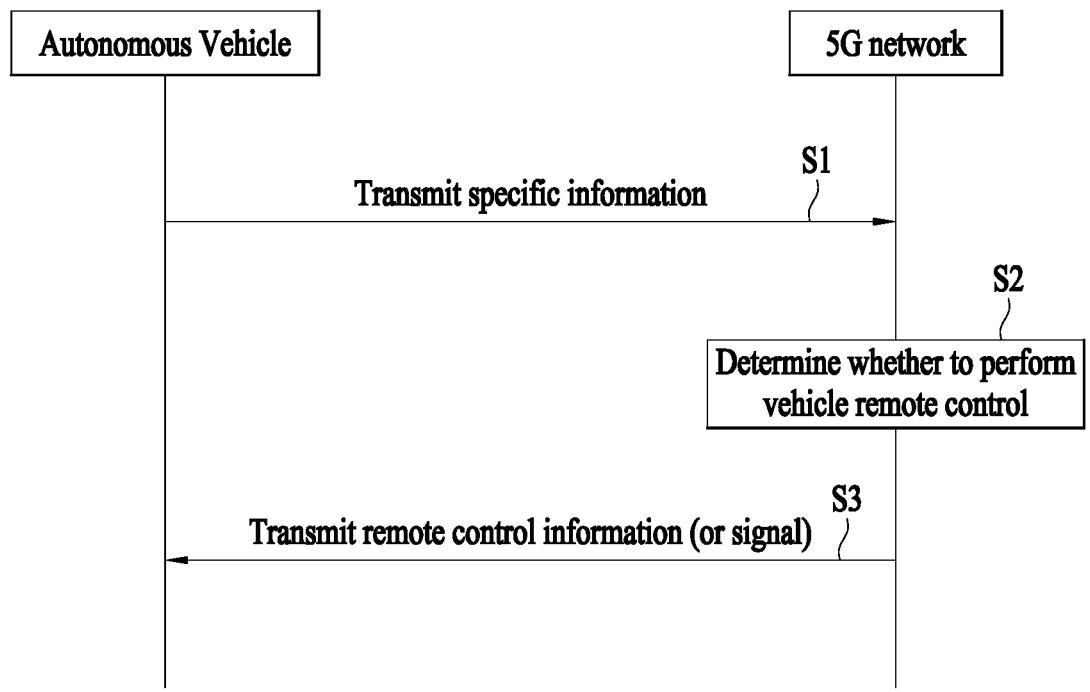
FIG. 16 illustrates an example of a basic operation of an autonomous vehicle and a 5G network in a 5G communication system.

FIG. 16 illustrates an example of a basic operation of an autonomous vehicle and a 5G network in a 5G communication system.

In step S1, the autonomous vehicle transmits specific information to the 5G network (S1). An embodiment may be described based on the autonomous vehicle, but may also be implemented via a general operating device, and an operation of the autonomous vehicle according to the present embodiment may correspond to an operation performed by the operating device according to the embodiments of the present disclosure. In addition, in an embodiment, the autonomous vehicle may transmit a message including identification information of the autonomous vehicle to the 5G network in advance in order to access the 5G network.

The specific information may include autonomous driving information. In addition, in an embodiment, the specific information may include at least one of container status block information and diff block information, and may include at least a part of information exchanged between respective nodes described in the above embodiments.

The autonomous driving information may be information directly related to vehicle driving control. For example, the autonomous driving information may include one or more of object data indicating an object around the vehicle, map data, vehicle state data, vehicle location data, and driving plan data.

In step S2, the autonomous driving information may further include, for example, service information required for autonomous driving. For example, the specific information may include information on a destination input through a user terminal and a stability level of the vehicle. Then, the 5G network may determine whether or not to remotely control the vehicle (S2). In an embodiment, information on whether or not to remotely control the vehicle may include information on a container of the operating device. For example, the 5G network may determine whether or not to transmit information on modulation/demodulation verification at the time of generation of a container, and may transmit the information to the operating device based on a determination result.

Here, the 5G network may include a server or a module that performs autonomous driving remote control. In an embodiment, the 5G network may include a memory capable of storing transmission/reception information.

In step S3, the 5G network may transmit information (or signals) on the remote control to the autonomous vehicle (S3).

As described above, remote control information may be signals applied directly to the autonomous vehicle, or may further include service information necessary for autonomous driving. In an embodiment of the present disclosure, the autonomous vehicle may provide an autonomous driving service by receiving service information such as information on the insurance for each selected area and information on dangerous areas in a driving route through a server connected to the 5G network. In addition, in an embodiment, location information determined by the operating device may be provided to the vehicle through the 5G network, and the vehicle may perform autonomous driving based on the received information. In addition, driving information may be provided to the user during autonomous driving.

In an embodiment, the 5G network may transmit information on an acquired container to the autonomous vehicle. More specifically, when generating a container, the operating device may request the 5G network for verification, and the 5G network may perform verification based on stored container information in response to the request and may provide a verification result to the operating device.

In an embodiment, the autonomous vehicle and 5G network may transmit and receive information through at least one of 5G communication, vehicle to vehicle (V2V) communication, vehicle to everything (V2X) communication, ultra-reliable low latency communication (URLLC), and enhanced mobile broadcast communication.

In addition, in an embodiment, the autonomous vehicle, which performs at least one of V2V communication and V2X communication, may transmit and receive information through a communication channel. For example, a sidelink channel for at least one of V2V communication and V2X communication may be allotted, and the autonomous vehicle may transmit and receive information to and from a server or another vehicle through the sidelink channel. For example, a sidelink shared channel may be allotted, and a signal for at least one of V2X communication and V2V communication may be transmitted and received through on the sidelink shared channel. In order to perform at least one of V2V communication and V2X communication, the autonomous vehicle may acquire a separate communication identifier from at least one of a base station, a network, and another vehicle. The autonomous vehicle may perform V2V or V2X communication based on the acquired identifier.

In an embodiment, broadcast information may be transmitted through a broadcast channel, and communication between nodes may be performed through a channel different from the broadcast channel. In addition, information for controlling the autonomous vehicle may be transmitted through an URLLC channel.

Figure 17:
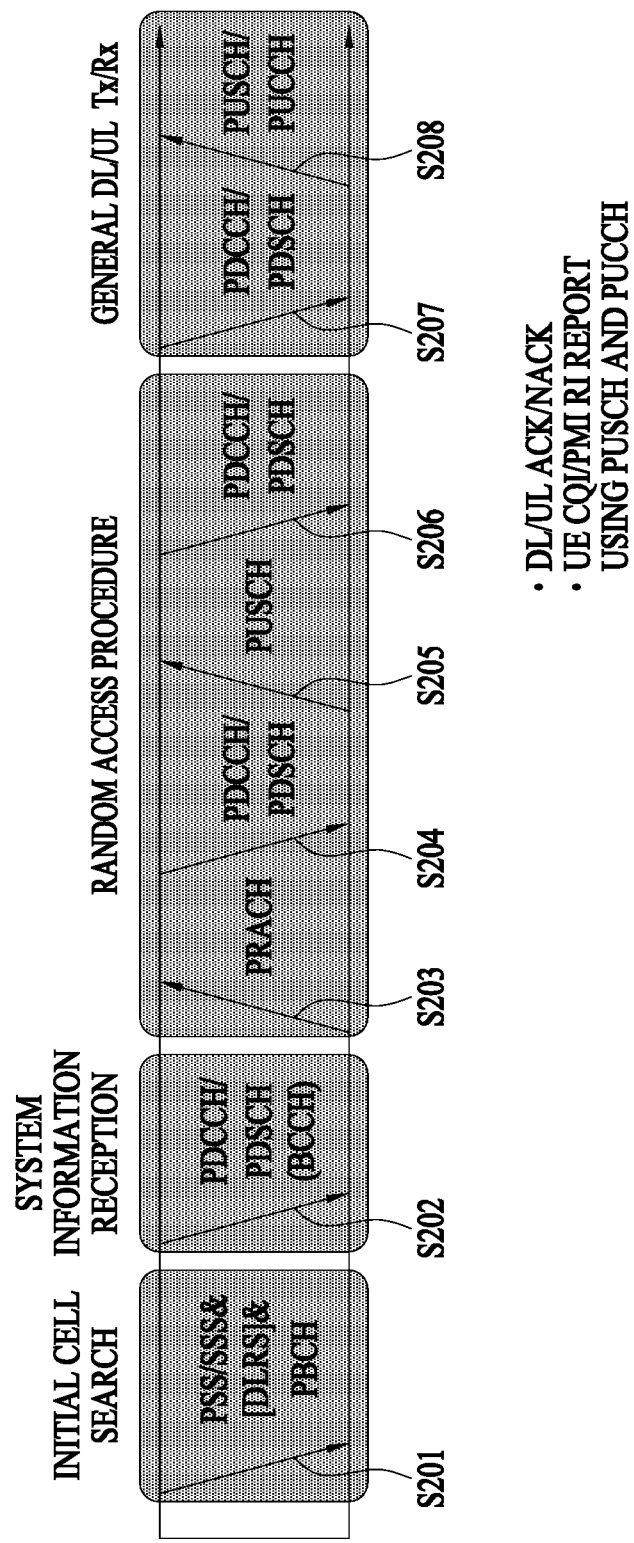
FIG. 17 is a view illustrating an example of a signal transmission/reception method in a wireless communication system.

Referring to FIG. 17, when UE is powered on or enters a new cell, the UE may perform initial cell search such as synchronization with a BS (S201). To this end, the UE may receive a primary synchronization channel (P-SCH) and a secondary synchronization channel (S-SCH) from the BS to synchronize with the BS, and may acquire information such as a cell ID. In an LTE system and an NR system, the P-SCH and the S-SCH may be called a primary synchronization signal (PSS) and a secondary synchronization signal (SSS), respectively. After the initial cell search, the UE may acquire broadcast information in the cell by receiving a physical broadcast channel (PBCH) from the BS. Meanwhile, the UE may check the state of a downlink channel by receiving a downlink reference signal (DL RS) during the initial cell search. After completing the initial cell search, the UE may acquire more specific system information by receiving a physical downlink control channel (PDCCH) and a physical downlink shared channel (PDSCH) based on information on the PDCCH (S202).

When the UE initially accesses the BS or when there is no radio resource for signal transmission, the UE may perform a random access procedure (RACH) for the BS (S203 to S206). To this end, the UE may transmit a specific sequence as a preamble through a physical random access channel (PRACH) (S203 and S205), and may receive a random access response (RAR) message for the preamble through the PDCCH and the PDSCH (S204 and S206). In the case of contention-based RACH, the UE may additionally perform a contention resolution procedure.

After performing the above-described procedure, the UE may perform, as general uplink/downlink signal transmission procedures, PDCCH/PDSCH reception (S207) and physical uplink shared channel (PUSCH)/physical uplink control channel (PUCCH) transmission (208). In particular, the UE may receive downlink control information (DCI) through the PDCCH. The UE may monitor a set of PDCCH candidates at monitoring occasions which are set in one or more control element sets (CORESETs) on a serving cell according to search space configurations. The set of PDCCH candidates to be monitored by the UE may be defined in terms of search space sets, and such a search space set may be a common search space set or a UE-specified search space set. The CORESET is composed of a set of (physical) resource blocks having a time duration of 1 to 3 OFDM symbols. The network may set the UE to have multiple CORESETs. The UE may monitor PDCCH candidates in one or more search space sets. Here, monitoring may refer to attempting to decode PDCCH candidate(s) in a search space. When the UE has succeeded in decoding one of the PDCCH candidates in the search space, the UE may determine that a PDCCH has been detected in a PDCCH candidate, and may perform PDSCH reception or PUSCH transmission based on DCI on the detected PDCCH. The PDCCH may be used to schedule DL transmissions through the PDSCH and UL transmissions through the PUSCH. Here, the DCI on the PDCCH may include downlink assignment (i.e., downlink (DL) grant) including at least modulation, coding format, and resource allotment information associated with a downlink shared channel or uplink (UL) grant including modulation, coding format, and resource allotment information associated with an uplink shared channel.

Referring to FIG. 17, initial access (IA) in the 5G communication system will be further described.

The UE may perform cell search, system information acquisition, beam alignment for initial access, and DL measurement based on an SSB. The SSB may be mixed with a synchronization signal/physical broadcast channel (SS/PBCH) block.

The SSB may be composed of a PSS, an SSS, and a PBCH. The SSB may be composed of four consecutive OFDM symbols, and the PSS, PBCH, SSS/PBCH, or PBCH may be transmitted for each OFDM symbol. Each of the PSS and SSS may be composed of 1 OFDM symbol and 127 subcarriers, and the PBCH may be composed of 3 OFDM symbols and 576 subcarriers.

The cell search may refer to a procedure in which the UE acquires time/frequency synchronization of a cell and detects a cell identifier (ID) (e.g., a physical layer cell ID (PCI)) of the cell. The PSS may be used to detect a cell ID in a cell ID group, and the SSS may be used to detect the cell ID group. The PBCH may be used for SSB (time) index detection and half-frame detection.

There may be 336 cell ID groups, and three cell IDs may exist for each cell ID group. Thus, a total of 1008 cell IDs may exist. Information on a cell ID group, to which a cell ID of a cell belongs, may be provided or acquired through the SSS of the cell, and information on a cell ID among cell IDs of 336 cell ID groups may be provided or acquired through the PSS.

The SSB may be transmitted periodically based on the periodicity of the SSB. An SSB basic period assumed by the UE at the time of initial cell search may be defined as 20 ms. After cell access, the periodicity of the SSB may be set to one of 5 ms, 10 ms, 20 ms, 40 ms, 80 ms, and 160 ms by a network (e.g., BS).

Next, acquisition of system information (SI) will be described.

The SI may be divided into a master information block (MIB) and multiple system information blocks (SIBs). The SI other than the MIB may be referred to as remaining minimum system Information (RMSI). The MIB may include information/parameters for monitoring the PDCCH which schedules the PDSCH carrying system information block 1 (SIB1), and may be transmitted by the BS through the PBCH of the SSB. The SIB1 may include information on the availability and scheduling (e.g., a transmission period and an SI-window size) of the remaining SIBs (hereinafter, SIBx (x being an integer of 2 or more)). The SIBx may be included in an SI message and may be transmitted through the PDSCH. Each SI message may be transmitted within a time window (i.e., an SI-window) which periodically occurs.

Referring to FIG. 17, random access (RA) in the 5G communication system will be further described.

The random access may be used for various purposes. For example, the random access may be used for network initial access, handover, and UE-triggered UL data transmission. The UE may acquire UL synchronization and UL transmission resources through the random access. The random access may be divided into contention-based random access and contention-free random access. A detailed procedure for the contention-based random access is as follows.

The UE may transmit a random access preamble as an Msg1 of the random access in UL through the PRACH. Random access preamble sequences having two different lengths may be supported. A Long sequence length of 839 may be applied to a subcarrier spacing of 1.25 kHz or 5 kHz, and a short sequence length of 139 may be applied to a subcarrier spacing of 15 kHz, 30 kHz, 60 kHz, or 120 kHz.

When the BS receives the random access preamble from the UE, the BS may transmit a random access response (RAR) message (Msg2) to the UE. The PDCCH which schedules the PDSCH carrying the RAR may be transmitted by being CRC-masked with a random access (RA) radio network temporary identifier (RNTI) (RA-RNTI). The UE, which has detected the PDCCH masked with the RA-RNTI, may receive the RAR from the PDSCH scheduled by the DCI carried by the PDCCH. The UE may check whether random access response information for the preamble transmitted by the UE, i.e., Msg1, is in the RAR. Whether the random access response information for the Msg1 transmitted by the UE is in the RAR may be determined by whether there is a random access preamble ID for the preamble transmitted by the UE. When there is no response to the Msg1, the UE may retransmit the RACH preamble a predetermined number of times while performing power ramping. The UE may calculate PRACH transmission power for retransmission of the preamble based on the most recent path loss and a power ramping counter.

The UE may transmit, as an Msg3 of the random access, UL transmission through the uplink shared channel based on the random access response information. The Msg3 may include an RRC connection request and an UE identifier. As a response to the Msg3, the network may transmit an Msg4, which may be treated as a contention resolution message in DL. By receiving the Msg4, the UE may enter an RRC-connected state.

Although the exemplary embodiments of the present disclosure have been described in this specification with reference to the accompanying drawings and specific terms have been used, these terms are used in a general sense only for an easy description of the technical content of the present disclosure and a better understanding of the present disclosure, and are not intended to limit the scope of the present disclosure. It will be clear to those skilled in the art that, in addition to the embodiments disclosed here, other modifications based on the technical idea of the present disclosure may be implemented.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An information processing method in an electronic device, the method comprising:
   identifying a first container that is logically docked on an operating system (OS);
   identifying an application corresponding to the first container;
   identifying an event related to running of the application; and
   transmitting, to other node, information regarding a first block on difference including first identification information for the first block on difference and second identification information for the first container,
   wherein the first identification information is identified based on first data generated based on the event, and
   wherein a second container having the second identification information is verified, in response to docking of the second container on the OS, based on the information regarding the first block on difference transmitted to the other node.

2. The method of claim 1, wherein the second identification information is generated based on at least a part of data included in the first container before the first container docks with the electronic device.

3. The method of claim 1, further comprising:
   transmitting, to the other node, information regarding a second block on difference including third identification information for the second block on difference generated based on second data associated with an additional event; and
   verifying fourth identification information on a third container including the first data and the second data,
   wherein the fourth identification information is verified based on the first identification information, the second identification information, and the third identification information.

4. The method of claim 3, further comprising receiving a verification response for the fourth identification information from the other node,
   wherein the verification response is determined based on at least a part of the information on at least one block on difference transmitted to the other node.

5. The method of claim 1, wherein the information regarding the first block on difference includes at least one of information on the electronic device, identification information on a block on difference generated before the first block on difference, information on an event by which the block on difference is generated, or information on the electronic device corresponding to the event.

6. The method of claim 1, further comprising transmitting, to the other node, information regarding a status of the first container in response to docking of the first container.

7. The method of claim 1, further comprising:
   generating a third container based on the first data and information included in the first container; and
   transmitting information regarding the third container to the other node.

8. The method of claim 7, further comprising:
   transmitting, to a receiving device, request information for transmitting the third container;
   receiving response information to the request information; and
   transmitting the third container to the receiving device based on the response information.

9. The method of claim 7, further comprising:
   storing the second identification information; and
   deleting the second identification information in response to generation of the third container.

10. A non-volatile memory medium comprising an instruction for executing the method of claim 1.

11. The method of claim 1, wherein the information regarding the first block on difference is transmitted through a channel allotted for at least one of a channel for vehicle to vehicle communication and a channel for vehicle to everything communication, and
   wherein the information regarding the first block on difference includes an identifier for identifying the electronic device and is transmitted to the other node through the channel by a 5G network.

12. An electronic device comprising:
   a transceiver to communicate with another electronic device; and
   a controller configured to:
   control the transceiver;
   identify a first container that is logically docked on an operating system (OS);
   identify an application corresponding to the first container;
   identify an event related to running of the application; and
   transmit, to other node, information regarding a first block on difference including first identification information for the first block on difference and second identification information for the first container,
   wherein the first identification information is identified based on first data generated based on the event, and
   wherein a second container having the second identification information is verified, in response to docking of the second container on the OS, based on the information regarding the first block on difference transmitted to the other node.

13. The electronic device of claim 12, wherein the second identification information is generated based on at least a part of data included in the first container before the first container docks with the electronic device.

14. The electronic device of claim 12, wherein the controller is configured to:
transmit, to the other node, information regarding a second block on difference including third identification information for the second block on difference generated based on second data associated with an additional event; and
verify fourth identification information on a third container including the first data and the second data, and
wherein the fourth identification information is verified based on the first identification information, the second identification information, and the third identification information.

15. The electronic device of claim 14, wherein the controller is configured to receive a verification response for the fourth identification information from the other node, and
wherein the verification response is determined based on at least a part of the information on at least one block on difference transmitted to the other node.

16. The electronic device of claim 12, wherein the information regarding the first block on difference includes at least one of information on the electronic device, identification information on a block on difference generated before the first block on difference, information on an event by which the block on difference is generated, or information on the electronic device corresponding to the event.

17. The electronic device of claim 12, wherein the controller is configured to transmit, to the other node, information regarding a status of the first container in response to docking of the first container.

18. The electronic device of claim 12, wherein the controller is configured to:
generate a third container based on the first data and information included in the first container; and
transmit information regarding the third container to the other node.

19. The electronic device of claim 18, wherein the controller is configured to:
transmit, to a receiving device, request information for transmitting the third container;
receive response information to the request information; and
transmit the third container to the receiving device based on the response information.

20. The electronic device of claim 18, wherein the controller is configured to:
store the second identification information; and
delete the second identification information in response to generation of the third container.

\* \* \* \* \*